United States Patent

Ogino et al.

[11] Patent Number: 5,589,883
[45] Date of Patent: Dec. 31, 1996

[54] CATHODE RAY TUBE DISPLAY

[75] Inventors: Masanori Ogino; Takeo Yamada; Miyuki Ikeda, all of Yokohama; Tsuneo Fujikura, Chigasaki; Takahiko Fujiwara, Yokohama; Etsuhiro Nakagiri, Yokosuka, all of Japan

[73] Assignee: Hitachi, Ltd., Tokyo, Japan

[21] Appl. No.: 257,441

[22] Filed: Jun. 8, 1994

Related U.S. Application Data

[62] Division of Ser. No. 813,082, Dec. 24, 1991, abandoned.

[30] Foreign Application Priority Data

Dec. 26, 1990 [JP] Japan ...................... 2-417590

[51] Int. Cl.$^6$ .................................................. H04N 5/68
[52] U.S. Cl. .......................... 348/379; 348/380; 315/381
[58] Field of Search ...................... 348/377, 378, 348/379, 380, 381, 913, 690–698, 173; 315/386, 381; 330/261; H04N 9/22, 5/68

[56] References Cited

U.S. PATENT DOCUMENTS

| 3,855,614 | 12/1974 | Okada | 348/380 |
|---|---|---|---|
| 3,898,381 | 8/1975 | Amsen et al. | 358/74 |
| 3,970,947 | 7/1976 | Sato et al. | 330/261 |
| 4,200,882 | 4/1980 | Janssen | 358/65 |
| 4,263,622 | 4/1981 | Hinn | 348/379 |
| 4,342,048 | 7/1982 | Falater et al. | 348/379 |
| 4,404,500 | 9/1983 | Stow | 358/60 |
| 4,482,921 | 11/1984 | Filliman | 348/379 |
| 4,484,229 | 11/1984 | Parker | 348/379 |
| 4,599,642 | 7/1986 | Willis . | |
| 4,679,092 | 7/1987 | Blanken et al. | 358/74 |
| 4,682,231 | 7/1987 | Yamakawa | 348/694 |
| 4,703,345 | 10/1987 | Matsuzaki et al. | 358/60 |

FOREIGN PATENT DOCUMENTS

| 2263335 | 12/1972 | Germany . |
|---|---|---|
| 2329898 | 6/1973 | Germany . |

OTHER PUBLICATIONS

E. Gublass, *Bildrohrenansteuerung mit automatischer Dunkelstrom–Regelung*, Funkschau 1979, vol. 12, pp. 675–678.

*Primary Examiner*—Micheal H. Lee
*Attorney, Agent, or Firm*—Antonelli, Terry, Stout & Kraus

[57] ABSTRACT

A cathode ray tube display in which a signal for detection of a cathode current is inserted into a part of the vertical blanking period of the video signal to be displayed, a cathode current corresponding to the signal for detection is detected, and a cathode voltage or a grid voltage is negative feedback controlled so that the detected cathode current becomes constant, thereby stabilizing the cathode current. The display has a local overscan circuit for executing a vertical scan on the screen with a width larger than a predetermined scan width only at a timing of the cathode current detecting signal inserted for a vertical blanking period, and even in the case where an underscan system to scan by a width smaller than a predetermined display screen width is used as a scan system of the screen display. The invention prevents a harmful visible display image by the cathode current detecting signal appears on the screen.

9 Claims, 18 Drawing Sheets

CATHODE RAY TUBE DISPLAY

This application is a Divisional application of Ser. No. 07/813,082, filed Dec. 24, 1991 now abandoned.

BACKGROUND OF THE INVENTION

The present invention relates to a cathode ray tube (CRT) display and, more particularly, to a CRT display having cathode current stabilzing means for stabilizing the cathode current.

As is well known, in a CRT display, generally, a video signal voltage is applied to a cathode electrode, and the magnitude of the cathode current is controlled synchronously with the horizontal and vertical deflection scans, thereby forming an image on the screen (fluorescent surface) of the CRT.

Converting characteristics from an input voltage of an electron gun of the CRT into an output cathode current are determined by the distance between electrodes. The converting characteristics consequently change due to a fluctuation in temperature of the electrode portion or the like, so that the fidelity of the gradations of a reproduced image deteriorates.

To prevent such deterioration, hitherto, there has been used a technique in which a black signal for detection and a white signal for detection are inserted for a vertical blanking period of a video signal, a cathode current corresponding to each of those signals is detected, and control is performed so that each cathode current always coincides with a predetermined value. The above technique is called automatic black balance and automatic white balance. Both balances are integratedly called a cathode current stabilizing system.

Reference may further be made to JP-B-55-38870 which discloses a technique to automatically correct deterioration of the black balance due to an aging effect or the like which is particularly conspicuous at portions near the black level of the signal.

SUMMARY OF THE INVENTION

The above conventional techniques have the following several shortcomings which have not been solved yet.

(1) In a home-use television receiver, in the case where the raster size is larger than the picture frame, namely, in the case of what is called an overscan, the white signal for detection for the vertical blanking period is hidden in the frame in the upper portion of the screen, so that interference on the screen is very small. In the case of underscan, as in a business-use computer display, however, the raster size is smaller than the frame. Consequently, the white signal for detection appears as white, luminescent-line interference in the upper portion of the screen. Therefore, hitherto, the white signal for detection cannot be inserted into an underscan type display because of the above reasons, so that the cathode current stabilizing system cannot be applied.

In FIG. 1, reference numeral 31 denotes a picture frame; 32 a raster; and 33 the white luminescentline interference mentioned above. The above circumstances will be further understood from the diagram.

(2) When the beam current stabilizing system is applied to what is called a projection type display in which images on three projecting CRTs (red, green, blue) are synthesized and displayed onto one screen by projection lenses, there is a problem that where a signal input of one color is too big, an increase in temperature of a portion near the face surface of the CRT corresponding to such a color is too large and, in an extreme case, the CRT is damaged.

The fundamental cause is based on a limitation on the hardware such that the conventional apparatus uses a system in which only the total value of anode (beam) currents of the CRTs of three colors is detected. In other words, the beam current of each single color cannot be detected.

It is, therefore, an object of the invention to solve the problems of the conventional techniques mentioned above and to provide a cathode ray tube display having cathode current stabilizing means which is more excellent and which has less side effect.

Another object of the invention is to provide a cathode ray tube display having cathode current stabilizing means which can be applied to an underscan type display.

Still another object of the invention is to provide a cathode ray tube display having cathode current stabilizing means which can be applied to a projection type display.

Still another object of the invention is to provide a cathode ray tube display having cathode current stabilizing means having excellent stability.

Still another object of the invention is to provide a cathode ray tube display having novel black level adjusting means which can solve a problem of a change in dynamic range of the video signal in association with the black level adjustment in the conventional techniques.

Still another object of the invention is to improve a fidelity of a reproduced image in a cathode ray tube display.

To accomplish the above objects, according to the invention, when cathode current stabilizing means is applied to the underscan type display, there is provided vertical deflection enhancing means (local overscan means) for enhancing the vertical deflection toward the upper portion of the screen in accordance with the timing to insert a signal for detection into the vertical blanking period of the video signal.

When the cathode current stabilizing means is applied to a projection type display, there is provided overcurrent suppressing means for preventing the cathode current of the CRT of each single color from becoming too big.

There is also provided black level adjusting means which can solve the problem of fluctuation of the dynamic range.

The vertical deflection enhancing means allows the raster to be overscanned at the detection signal insertion timing in the vertical blanking period of the video signal, thereby preventing the white, luminescent-line interference due to the detection signal from occurring in the screen display area.

The overcurrent suppressing means detects the cathode currents of the CRTs, calculates a mean value, obtains the maximum value, compares the maximum value with a predetermined threshold, and controls and suppresses the gain of a preamplifier section of the video signal on the basis of the result of the comparison.

The black lever adjusting means has the function of controlling a relative potential to the input video signal of the black level signal for detection which is inserted for the vertical blanking period. As will be understood from the following detailed description, the operation bias voltage in the video output amplifier circuit of the input video signal is held unchanged, and therefore the dynamic range does not deteriorate.

DESCRIPTION OF THE PREFERRED EMBODIMENTS

Figure 2:
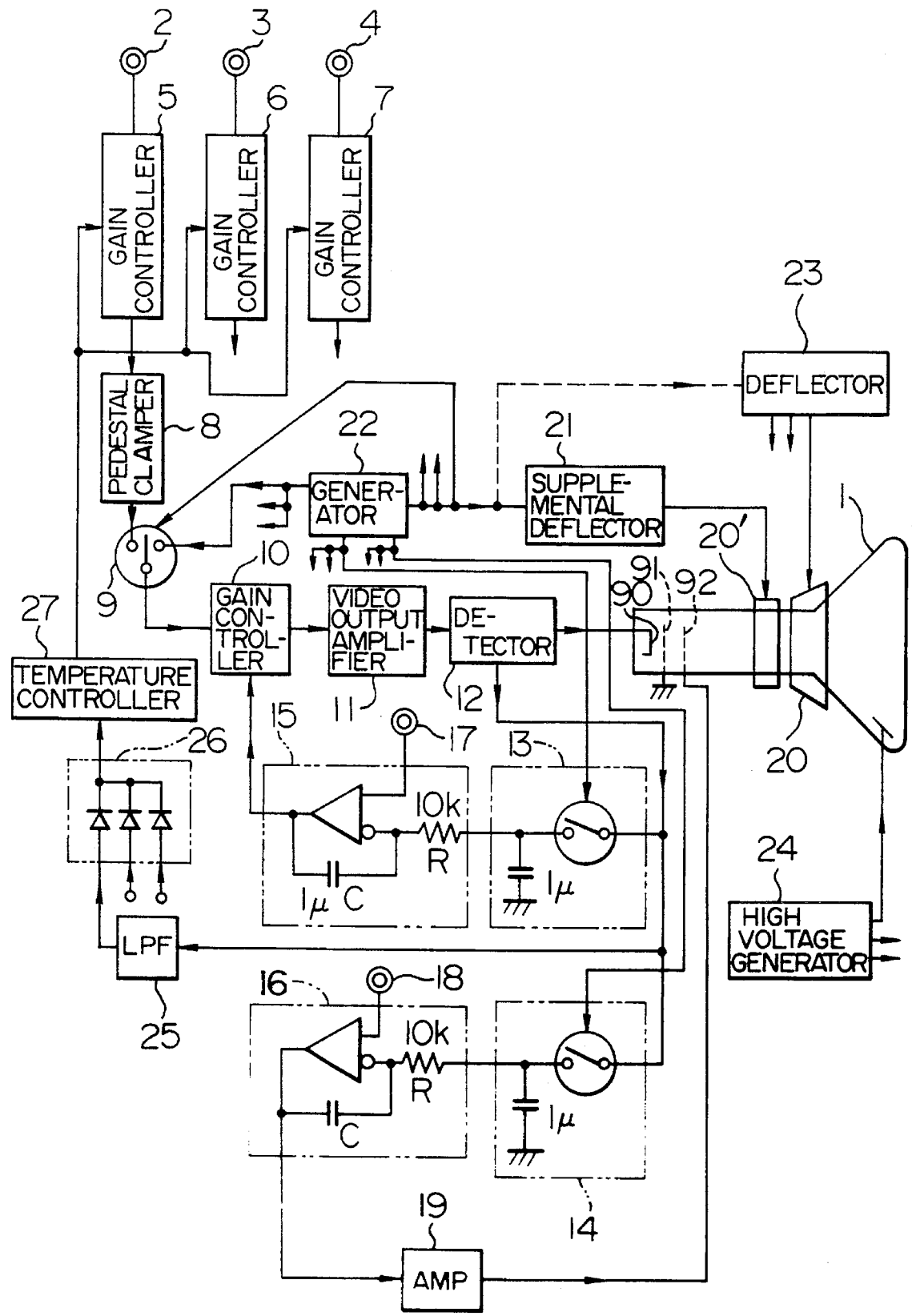
FIG. 2 is a circuit diagram showing the first embodiment as a fundamental construction of the present invention.

FIG. 2 shows a fundamental embodiment of the invention. The diagram shows the case where the invention is applied to a projection type display of the 3-CRT type.

In the diagram, reference numeral 1 denotes a CRT. Although not shown, an image on the CRT is enlarged and projected onto the screen by projection lens means which is provided separately. Reference numeral 90 denotes a cathode, and 91 and 92 indicate first and second grids, respectively. Although further two CRTs are used for the other two colors, they are not shown for simplicity of explanation.

Reference numerals 2, 3, and 4 denote three primary color video signal input terminals. Reference numerals 5, 6, and 7 denote well-known gain controllers, each for increasing or decreasing the gain of the video signal on the basis of an input from a temperature controller 27. Although outputs of the gain controllers 6 and 7 have to be connected to circuits which are similar to that for the output of the gain controller 5, they are omitted from the diagram. The output video signal of the gain controller 5 is supplied to a well-known pedestal clamping circuit or pedestal clamper 8, and its DC component is reproduced. The output of the pedestal clamper 8 is supplied to an analog switch 9.

The operation of the analog switch 9 will be explained in detail later because it is one of the main sections of the invention. The output of the switch 9 is supplied to a video output amplifier 11 through a gain controller 10. The output of the amplifier 11 is supplied to the cathode electrode of a CRT 1 through a cathode current detector 12 (which will be explained in detail later). The output of the detector 12 is supplied to three portions. That is, the output of the detector 12 is supplied to a sample and hold circuit (S/H circuit) 13 to detect a white current, a S/H circuit 14 to detect a black current, and a low pass filter (LPF) 25. Each of the S/H circuits 13 and 14 comprises an analog switch for sampling and a capacitor for holding as shown in the diagram. Outputs of the S/H circuits 13 and 14 are supplied to operational amplifiers 15 and 16 for integration.

DC voltages corresponding to target white and black currents are supplied to terminals 17 and 18, respectively. The output of the operational amplifier 15 is supplied to the control terminal of the gain controller 10, thereby controlling the gain of the controller 10. The output of the operational amplifier 16 is supplied to the second grid 92 of the CRT 1 through an amplifier 19.

The third output of the cathode current detector 12 is supplied to a maximum value detector 26 through the low pass filter 25. The detector 26 also receives input signals from different group of low pass filters corresponding to the other two colors. The output of the detector 26 is supplied to the gain control terminals of the gain controllers 5, 6, and 7 through the temperature controller 27, thereby controlling the gains of the controllers 5, 6, and 7 in parallel.

Reference numeral 20 denotes a deflecting coil to deflect an electron beam; 20' a supplemental deflecting coil to supplementally deflect the electron beam; 23 a deflector; and 21 a supplemental deflector (ordinarily, referred to as a registration circuit).

Reference numeral 22 denotes a signal generator. A group of signal waveforms which are generated from the signal generator 22 will be described in detail later. A group of outputs of the signal generator 22 are supplied to the analog switch 9, S/H circuits 13 and 14, and supplemental deflector 21. Reference numeral 24 denotes a high voltage generator. An output of the generator 24 is supplied to an anode of the CRT 1. The circuit operation will now be described.

In FIG. 2, three negative feedback loops forming a fundamental construction of the embodiment exist.

The first loop is a white current stabilizing loop 10, 11, 12, (1), 13, and 15. It is now assumed that a cathode white current corresponding to the white signal for detection of the cathode current becomes too big because of a fluctuation of the characteristics of the electron gun of the CRT 1. The too-big white current is consequently detected by the cathode current detector 12, thereby making the output voltage of the detector 12 too big. The too-big voltage is sampled and held by the S/H circuit 13 and applied to the operational amplifier 15. Thus, the output voltage of the amplifier 15 drops.

The voltage drop reduces the gain of the gain controller 10. The video signal output, therefore, decreases the amplitude of the video output signal which is supplied to the CRT 1 through the video output circuit 11 and cathode current detector 12. Thus, the white cathode current of the CRT 1 decreases. That is, the first loop performs a negative feedback operation in order to stabilize the white current.

The second loop is a black current stabilizing loop 12, 14, 16, 19, and 1. It is now assumed that the black current corresponding to the black signal for detection becomes too big because of a fluctuation of the characteristics of the electron gun of the CRT 1. The too-big black current is, therefore, detected by the cathode current detector 12, thereby making the output voltage too big. Further, the too-big black current passes the S/H circuit 14 and operational amplifier 16 and reduces the output voltage thereof. Thus, the output voltage of the amplifier 19 drops.

The voltage drop reduces the second grid voltage of the CRT 1, so that the black cathode current decreases. That is, the second loop executes a negative feedback operation in order to stabilize the black current.

The third loop is a cathode current limiting loop 5, 8, 9, 10, 11, 12, (1), 25, 26, and 27 for each color. It is now assumed that only the input amplitude of the terminal 2 among the video signal input terminals 2, 3, and 4 becomes too big. The video signal amplitude which is supplied to the CRT 1 through the component elements 5, 8, 9, 10, 11, and 12 becomes too big, so that the cathode current of the CRT becomes too big. The detection output voltage of the cathode current detector 12, therefore, becomes too big. Consequently, the average voltage which is derived in the output of the low pass filter 25 also becomes too big. The output voltage of the maximum value detector 26, consequently, also becomes too big.

As will be explained later, since an inverter function is included in the temperature controller 27, its output voltage decreases. The decrease in the above output voltage reduces the gains of the gain controllers 5, 6, and 7 in parallel. The temperature controller 27, accordingly, executes a negative feedback operation to restrict the average beam current so that it does not become too big.

As is well known, the conventional beam current limiting circuit uses the method whereby only the total value of anode currents of three colors is detected from the high voltage generator 24 in FIG. 2. Therefore, for instance, in the case of reproducing a bright image of only one color, there is a case where the temperature increase of the CRT of such a color is excessive and the CRT is damaged. In the embodiment, the cathode current is detected for each color independently in place of the total value of the anode currents of three colors, the maximum value of the detection outputs is obtained, and the gains of the video signals of three colors are suppressed in parallel on the basis of the result of the maximum value. The damage of CRT, therefore, can be eliminated. Since the above suppressing processes are executed in parallel for three colors, there is no side effect such that the white balance is broken.

A main section in FIG. 2 will now be described further in detail.

Figure 3A:
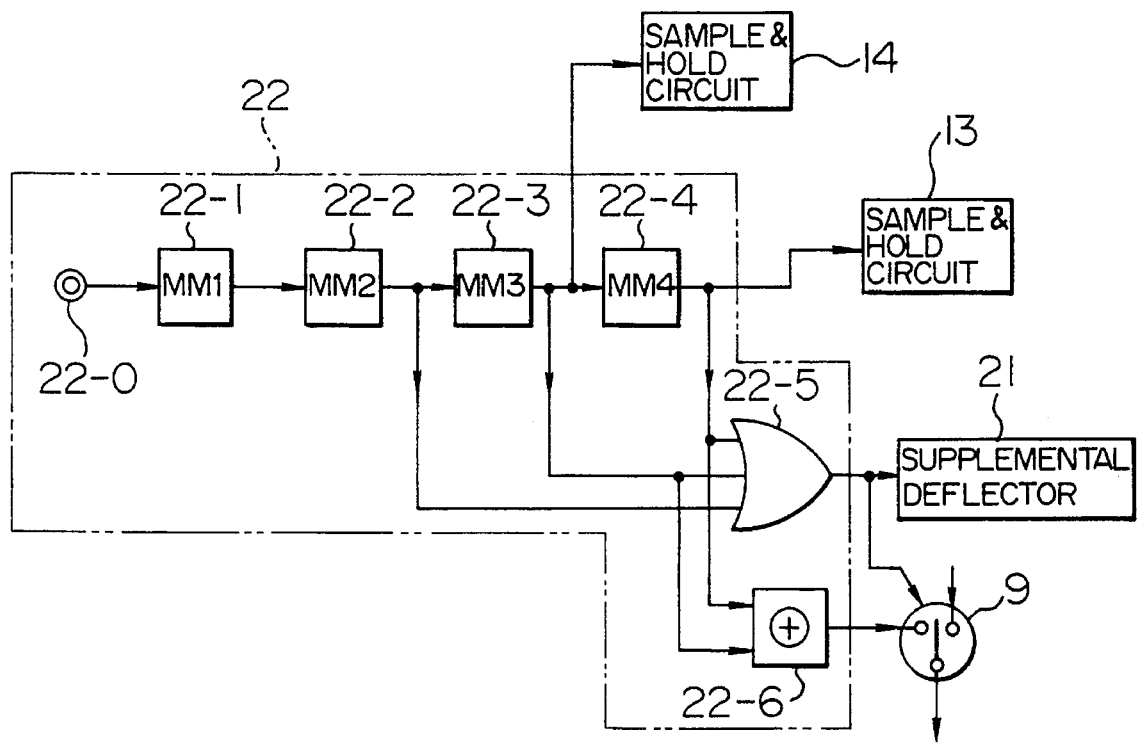
FIGS. 3A and 3B are a block diagram showing the details of signal generator 22 in FIG. 2 and its peripheral circuit construction and a waveform diagram showing a signal waveform in each section in FIG. 3A.

FIG. 3A shows the details of the signal generator 22 in FIG. 2 and its peripheral components. In the diagram, the portions having the same functions as those in FIG. 2 are designated by the same reference numerals. (The portions having the same functions are designated by the same reference numerals in the whole specification.)

Figure 3B:
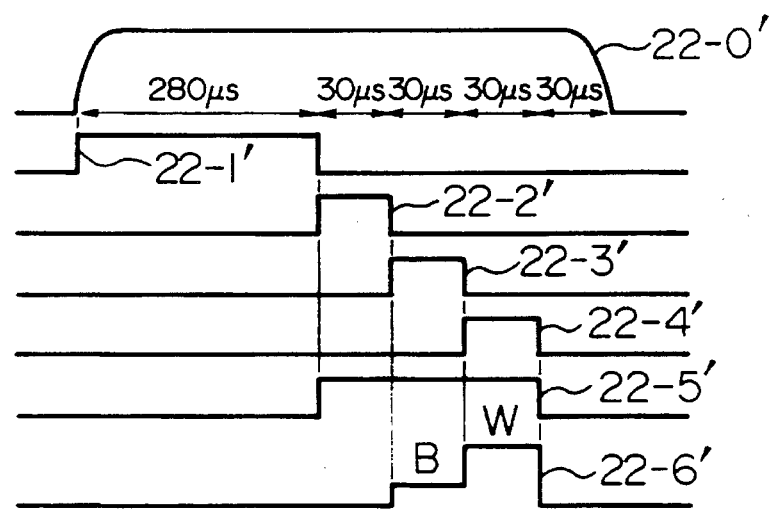

In FIG. 3A, reference numeral 22-0 denotes a vertical blanking pulse input terminal; 22-1, 22-2, 22-3, and 22-4 indicate monostable multivibrators; 22-5 an OR gate; and 22-6 a mixing circuit. FIG. 3B shows output waveforms of the blocks shown in FIG. 3A, respectively. Namely, 22-0' denotes a vertical blanking pulse input to the terminal 22-0. 22-1' to 22-6' denote the outputs of the blocks 22-1 to 22-6, respectively. Numerical values shown in FIG. 3B relate to an example in the case where the width of the vertical blanking pulse is equal to about 400 μsec.

The mixing circuit 22-6 of the insertion signals for detection generates an output signal corresponding to the input from the monostable multivibrator 22-3, which is by the low level output as compared with the level of the output signal corresponding to the input from the monostable multivibrator 22-4. Therefore, in the output waveform of the mixing circuit 22-6, as shown by the waveform 22-6', the low level in the portion "B" corresponding to the block 22-3 is used as a black signal for detection. On the other hand, the high level in the portion "W" corresponding to the block 22-4 is used as a white signal for detection.

The insertion signal for detection is supplied to one of the input terminals of the analog switch 9. The video signal is supplied to the other input terminal of the switch 9, as already mentioned in FIG. 2. An output of the OR gate 22-5 is supplied to a switching control terminal of the analog switch 9. For a period of time during which the output of the OR gate 22-5 is at the "H" level, the analog switch is switched to the side of the insertion signal for detection.

As shown in FIG. 3A, the output of the monostable multivibrator 22-3 is supplied to a control terminal of the S/H circuit 14 for detection of the black current. The switch for sampling is closed only for the period of time during which the black signal for detection exists.

The output of the monostable multivibrator 22-4 is supplied to the control terminal of the S/H circuit 13 for detection of the white signal. The switch for sampling is closed only for the period of time during which the white signal for detection exists.

The output of the OR gate 22-5 is an overscan pulse signal to overscan the insertion signal for detection and is supplied to the supplemental deflector 21, thereby supplementally deflecting the electron beam upward for a period of time during which at least the insertion signal for detection of the cathode current exists. Therefore, the upper luminescent-line interference which is not yet solved by the conventional techniques can be hidden to the outside of the display area of the display screen. A reason why the pulse which is supplied to the supplemental deflector 21 is preceded by a timing corresponding to the pulse width of the monostable multivibrator 22-2 in FIG. 3B is to compensate for the delay time in the deflector 21.

Figure 4:
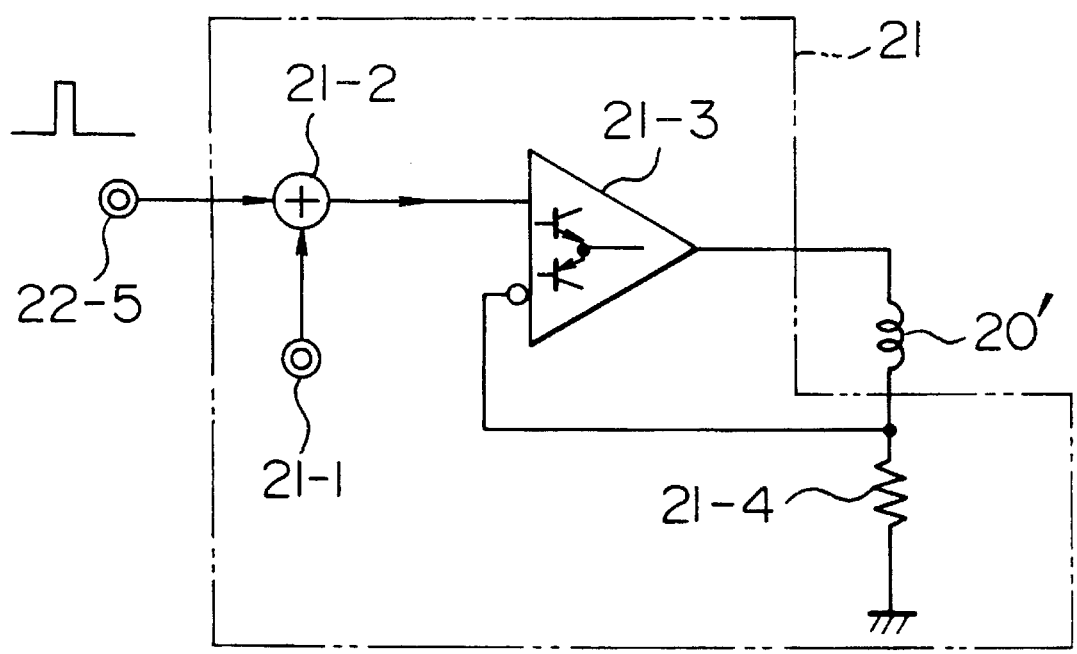
FIG. 4 is a circuit diagram showing a practical example of a supplemental deflector 21 in FIG. 2.

FIG. 4 shows a specific example of the supplemental deflector 21 in FIG. 2 and its peripheral components. In FIG. 4, reference numeral 22-5' denotes the overscan pulse signal; 21-1 indicates another well-known signal source terminal for supplemental deflection which is used to correct a color deviation (mis-registration) of the screen; 21-2 an adder; 21-3 a negative feedback amplifier; 20' the vertical supplemental deflecting coil; and 21-4 a resistor to detect a current.

According to the above construction, an electron beam can be locally overscanned to a region out of the upper display area for the period of time during which the overscan pulse signal 22-5' is at the "H" level.

Figure 5:
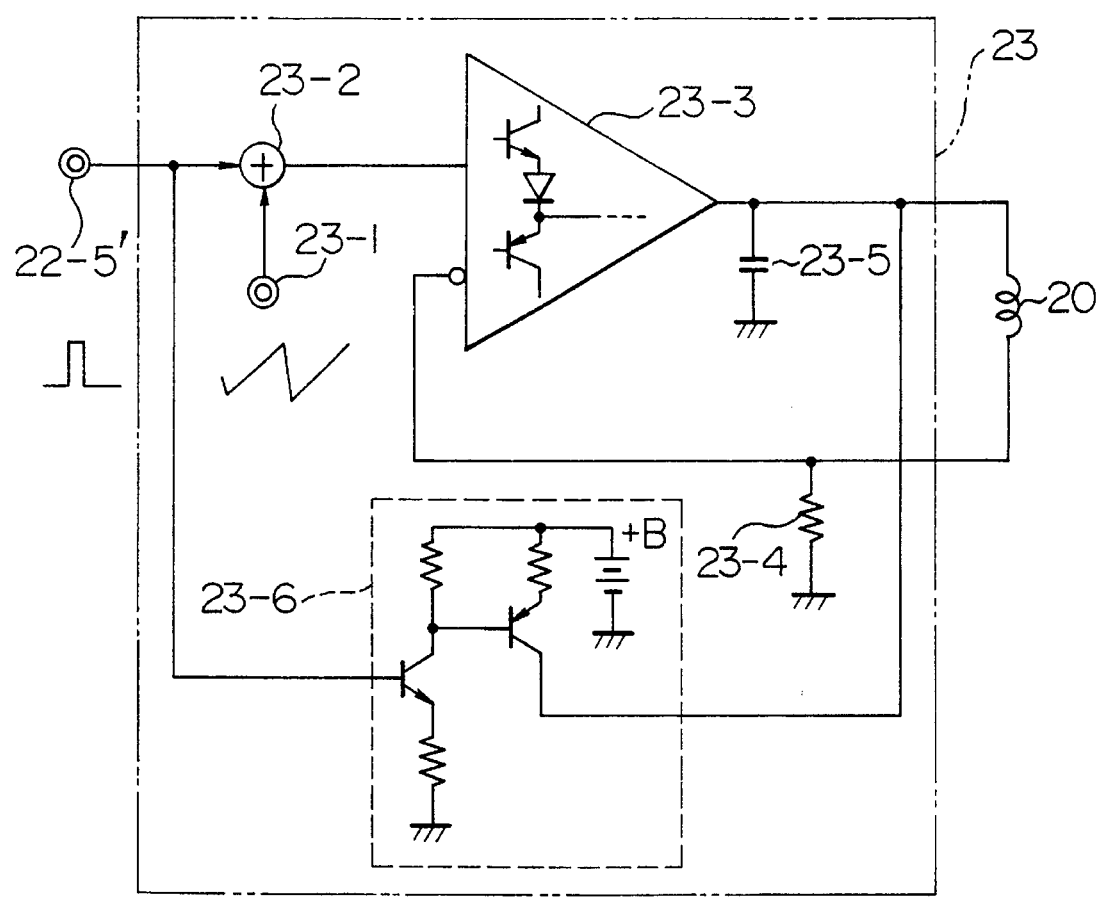
FIG. 5 is a circuit diagram showing local overscan means formed on the main deflector side.

As already mentioned above, FIG. 2 shows an example of the application of the invention to a 3-CRT type projection type display. In the case of applying the invention to an ordinary direct vision type display having no supplemental deflector, it is necessary to perform the local overscan on the main deflector side. FIG. 5 shows such an example.

In FIG. 5, reference numeral 23 denotes the deflector; 23-1 a saw-tooth wave signal of the vertical period; 23-2 an adder; 22-5' the overscan pulse signal; and 23-3 a negative feedback amplifier. A reverse current blocking diode is serially inserted in an output section of the amplifier 23-3. Reference numeral 20 denotes the vertical deflecting coil; 23-4 a resistor for current detection; 23-5 a capacitor for flyback resonance; and 23-6 a local overscan energizing circuit. A power source voltage in the circuit 23-6 is set to a value which is about five times (100 $V_{DC}$) as high as the power source voltage of the negative feedback amplifier 23-3.

The overscan pulse signal 22-5 passes through the adder 23-2 and gives a local overscan command to the negative feedback amplifier 23-3. The overscan pulse signal also passes through the local overscan energizing circuit 23-6 and allows a pulse-shaped current to forcedly flow in the deflecting coil 20. Therefore, the desired local overscan can be accomplished.

Figure 6:
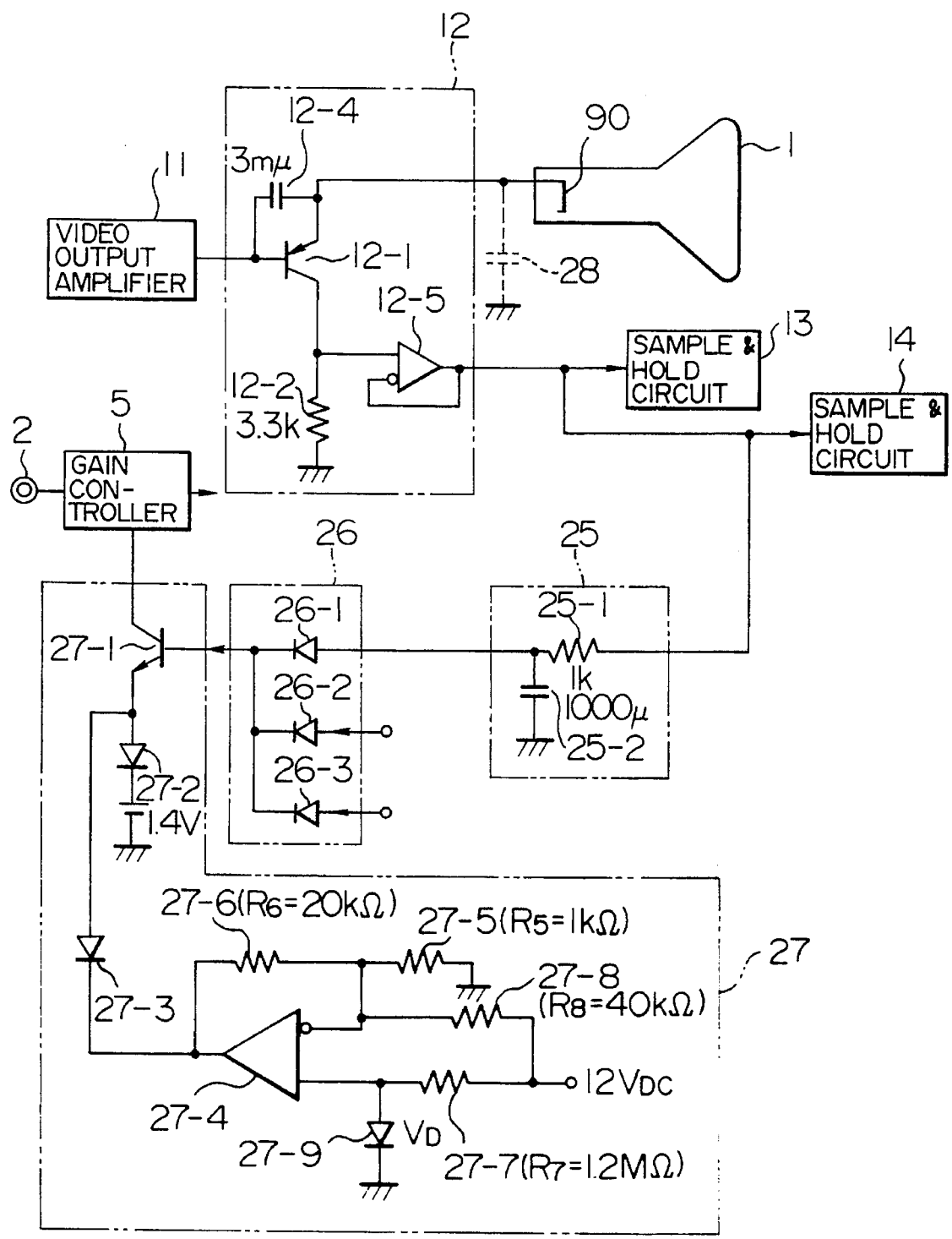
FIG. 6 is a circuit diagram showing the details of a cathode current limiting loop in FIG. 2.

FIG. 6 shows an example of a detailed construction of a main section of the third loop, namely, the cathode current loop in FIG. 2 of the invention. FIG. 2 has to also be referred to together with FIG. 6.

In FIG. 6, the cathode current detector 12 comprises: a PNP transistor 12-1; a resistor 12-2 for current detection; a capacitor 12-4 for smear prevention (which will be explained later in detail); and a voltage follower 12-5. In the example of the reference numerical values in the diagram, therefore, a voltage of 3.3 V is generated for a cathode current of 1 mA.

Reference numeral 25 denotes the low pass filter comprising a resistor 25-1 and a capacitor 25-2. Reference numeral 26 denotes the maximum value detector to detect the maximum level among the signal levels of three colors, including the other two colors. The maximum value detector 26 comprises diodes 26-1, 26-2 and 26-3 for the respective colors. Reference numeral 27 denotes the temperature controller comprising: a common emitter inverter transistor 27-1; diodes 27-2 and 27-3; and a temperature correction voltage generating section 27-4 to 27-9. Reference numeral 27-4 denotes an operational amplifier; 27-5 to 27-8 indicate resistors; and 27-9 a diode for temperature correction.

The main section will now be described in detail. The temperature correction voltage generating section 27-4 to 27-9 will be first described.

According to the principle of the operational amplifier and the principle of superposition, an output voltage E from the operational amplifier 27-4 is obtained in accordance with the following equation, using symbols in FIG. 6.

$$E \approx V_D \{1 + (R_6/R_5)\} - (R_6/R_8) \cdot 12 \text{ V} \quad (1)$$
$$\approx R_6 \{(V_D/R_5) - (12 \text{ V}/R_8)\}$$

By substituting the example of the numerical values also written in FIG. 6, $$E \approx 20 V_D - 6 \text{ V} \quad (2)$$

where, $V_D$ denotes the forward direction voltage drop of the silicon diode 27-9. There is the relation of the following equation between the voltage drop $V_D$ and a current I of the diode 27-9 from the property of the graded junction type PN junction.

In the following equation, T denotes absolute temperature, and a value of $V_D$ at an ordinary temperature of 300° K. when the current I is equal to 1 mA is set to $V_D$ (ordinarily, about 0.6 V).

$$I/1 \text{ mA} = \exp \{q(V_D - V_0)/(2kT)\} \quad (3)$$
$$\approx \exp \{(V_D - 0.6 \text{ V})/50 \text{ mV}\}$$

where,
k: Boltzmann's constant
T: Absolute temperature
q: Charge of an electron $$(2 kT)/q \approx 50 \text{ mV} 1 \propto \exp \{q(V_D - V_G)/(2 kT)\} \quad (4)$$

where, $V_G$: Energy gap of electrons (about 1.12 V)

In the constants of FIG. 6, the level of current flowing in the diode 27-9 is equal to about 10 μA. Therefore, the value of $V_D$ is set to about 0.37 V from equation (3).

The following equation, indicative of the temperature characteristics, is obtained by differentiating equation. (4) under the condition of the constant current I. The reason why the current I is constant is the current flowing in the diode in FIG. 6 is equal to about 10 μA (constant).

$$\Delta(V_D - V_G)/(V_D - V_G) = \Delta T/T \therefore \Delta V_D/\Delta T = \quad (5)$$
$$(V_D - V_g)/T \approx (0.37 \text{ V} - 1.12 \text{ V})/300 \text{ K} = -2.5 \text{ mV/k}$$

The following equation is derived by substituting the above results into equation (1).

$$E \approx 20 \{0.37 \text{ V} - (2.5 \text{ mV/K}) \cdot \Delta T\} - 6 \text{ V} \quad (6)$$
$$= 1.4 \text{ V} - (50 \text{ mV/K}) \cdot \Delta T$$

The voltage 1.4 V at the ordinary temperature coincides with the value 1.4 V of a reference voltage source provided under the diode 27-2 in FIG. 6.

When the threshold value of 1.4 V at the ordinary temperature is added to the total voltage drop of 1.8 V of the diodes 27-3 and 27-2 and the diode 26-1 in FIG. 6, the resultant value is equal to an equivalent voltage difference of 3.2 V referred to the resistor 12-2 of 3.3 kΩ. Therefore, it corresponds to the cathode threshold current of about 1 mA. The mean value of the cathode current per unit cathode at room temperature and lower temperatures, therefore, is limited to 1 mA or lower (due to the function of the third loop mentioned above).

At a high temperature, e.g., 330° K. (i.e., 58° C.), a value of ΔT of the equation (6) is equal to 30 K., so that the value of E drops from 1.4 V to −0.1 V. The threshold cathode current, therefore, is corrected from 1 mA to 0.55 mA, so that the electric power which is supplied to the CRT is suppressed and damage to it is prevented.

It is effective to arrange the diode 27-9 to a position near the CRT. A circuit using a thermistor in place of the diode is also possible.

Figure 7:
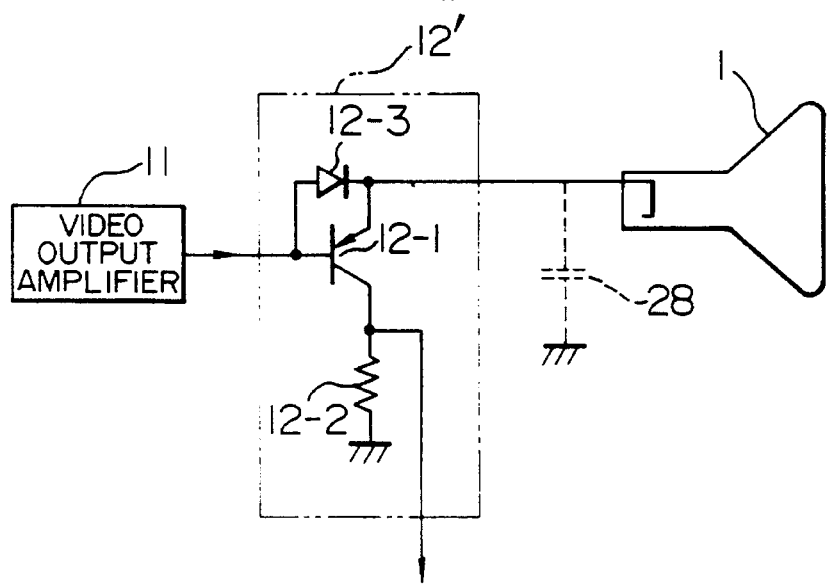
FIG. 7 is a circuit diagram showing a conventional example of a cathode ray tube cathode current detecting section.

The smear prevention capacitor 12-4 as a main section of the cathode current detector 12 will now be described. FIG. 7 shows the conventional technique corresponding to the above section.

In the diagram, the transistor 12-1 also has an emitter follower function with respect to the high frequency video signal. The emitter follower normally operates so long as a stray capacitor 28 does not exist at the cathode of the CRT 1. However, a stray capacitor of at least about 5 pF actually exists, and such a capacitor generates a smear interference due to the interaction with the unidirectional conductivity of the transistor 12-1.

Figure 8:
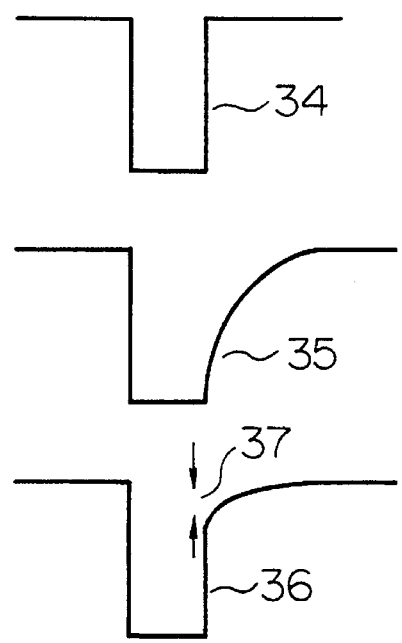
FIG. 8 is a waveform diagram showing smear interference in FIG. 7.

The reason is shown in a waveform diagram of FIG. 8. In the diagram, reference numeral 34 denotes an input waveform of the transistor 12-1 in FIG. 7 and 35 indicates an output waveform in the case where the diode 12-3 does not exist. A large smear interference occurs in such a case. This is because the transistor 12-1 is put in a cut-off state.

Reference numeral 36 denotes a waveform in the case where the diode 12-3 exists. However, a smear interference of an amplitude shown by reference numeral 37 remains. The smear amplitude in the above case is equal to about 1.2 $V_{pp}$. Such a remaining smear interference is a drawback of the conventional technique.

The diode 12-3 has another drawback in that a current corresponding to the positive half period of the high frequency current flowing in the diode 12-3 is added to the collector current of the transistor 12-1 in the negative half period. There is consequently a drawback in that the cathode current value to be detected is erroneously evaluated to be a value which is several times or more times as high as the true value.

In FIG. 6 showing the main section of the embodiment of the invention, the capacitor 12-4 is added to eliminate the smear interference. The value C of the capacitor is set so as to also satisfy the needs which are caused from three negative feedback loops in FIG. 2.

To suppress the smear interference, it is necessary to make the transistor 12-1 inoperative for the high frequency component of the video signal. For this purpose, in the case where a high frequency input signal of up to about 60 $V_{pp}$ has been applied to the transistor 12-1, the high frequency amplitude across the base and the emitter needs to be suppressed to 0.6 $V_{pp}$ or lower (almost corresponding to the allowable limit). For this purpose, it is necessary to set the value of C to a value which is about 100 or more times as high as the stray capacitance of 5 pF, that is, 500 pF or more.

$$C > 500 \, pF \tag{7}$$

On the other hand, a high response speed of the detector is required from the second loop, namely, the black current stabilizing loop among the three negative feedback loops in FIG. 2. When expressing by the response time, the time which is about (⅓) of the sampling period of 30 µsec in FIG. 3 or less, that is, 10 µsec or less is necessary.

A response time τ of the detector is given by τ=CR by obtaining an input resistance R on the emitter side by regarding the transistor 12-1 as a common base transistor. In the case of the graded junction, a value of R can be derived as follows from the equation (4) as a general equation of the PN junction.

$$R = (2\,kT)/(Iq) = 50 \, mV/I \tag{8}$$

In the above equation, I denotes the cathode current corresponding to the black signal for detection and is set to about 50 µA (about 1000 µA for the white signal). By substituting such a value for the above condition, $$10 \, \mu s \geq RC = 1 \, K\Omega C \therefore C \leq 10 \, m\mu F \tag{9}$$

By combining with the equation (8), $$0.5 \, m\mu F \leq C \leq 10 \, m\mu F \tag{10}$$

In the example of FIG. 6, therefore, a value of the capacitor 12-4 is set to 3.3 mµF. When equation (10) is satisfied, no smear interference occurs on the screen, and the black current can be detected at a high speed. Effects of the fundamental embodiment in FIG. 2 of the invention will now be shown below.

(1) First loop (white current stabilizing loop)

In the case where the image is displayed by the underscan in which the image is scanned in a range narrower than the frame, since the insertion signal portion for detection is locally overscanned to a region out of the image display area, the harmful luminescent line interference, which would otherwise occur in the upper portion of the screen, can be eliminated.

(2) Second loop (black current stabilizing loop)

Since the second loop uses a system in which the second grid voltage of the CRT is controlled (the bias voltage of the video output is held unchanged), the finite video output dynamic range can be effectively used. Hitherto, in the prior art since there is used a system called an Auto Kine Bias (AKB) system in which the operating point of the video output transistor is shifted, there has been a problem that the effective dynamic range is damaged due to the cut-off or saturation of the transistor in association with the shift. This invention has overcome that problem. In addition, this invention has overcome the smear problem associated with the detector.

The advantage of the invention can be also utilized in the black level adjusting system, as will be explained in other paragraphs of the description of the modifications of the invention later.

(3) Third loop (cathode current limiting loop)

In the conventional total anode current detecting system, in the case where the total current threshold is set to, for instance, 1.5 mA, the cathode current of each of three CRTs has to be limited to about 0.5 mA or less when the average white signal is inputted. However, for example, when a still image signal in which a strong green is a main component is inputted, the cathode current of up to 1.5 mA flows in only the CRT for green.

This means that the high voltage electric power which is applied to the fluorescent surface of the CRT is increased from 15 W to 45 W in the case of a high voltage of 30 kV. There is a case where the electron gun of the CRT, the fluorescent surface, and the adjacent projection lens are also thermally broken.

In the embodiment, in the case where the threshold value is set to 1 mA, the cathode current of each CRT can be certainly limited to 1 mA, or less even, for any input signal. Thus, the electric power can be limited to 30 W or less, and damage, accordingly, can be prevented.

When the white signal is inputted, the total current of total 3 mA can be allowed to flow, so that the clear image which is about two times brighter than the conventional image can be displayed.

Further, since the apparatus has a temperature controller, in the case where an ambient temperature becomes high, overheating of the main section can be prevented.

Extended embodiments which can further affect the advantage of the invention will now be described.

The ordinary display has adjusting means for image adjustment and black level adjustment in a manner such that the user can reset a luminance of image and a degree of gradation near the black level in accordance with the ambient illuminating conditions. Hitherto, the details of the above adjusting means are as shown in FIG. 9.

Figure 1:
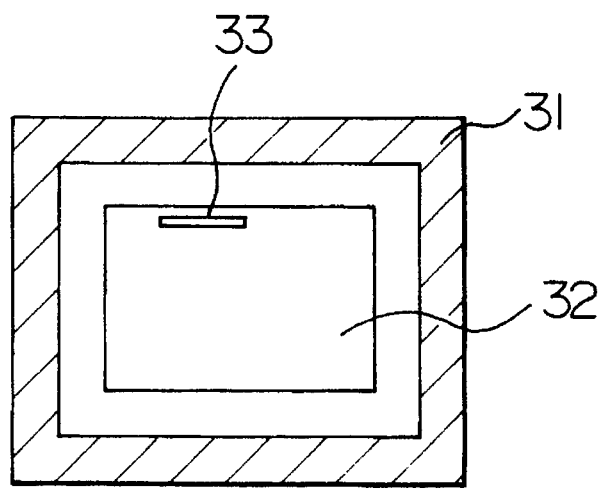
FIG. 1 is an explanatory diagram of a display screen to show the problem upon underscan on the screen of a cathode ray tube.
Figure 9:
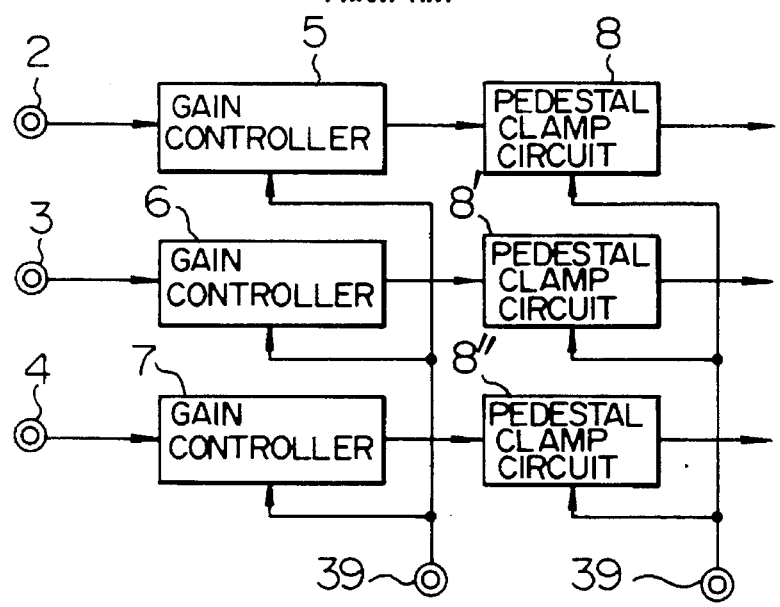
FIG. 9 is a circuit diagram showing a conventional example of image adjusting means and black level adjusting means.

In FIG. 9, for image adjustment, the gains of the gain controllers 5, 6, and 7 in FIGS. 2 and 9 are controlled from a control terminal 38 which is externally provided. For black level adjustment, clamp voltages of pedestal clamp circuits 8, 8', and 8' in FIG. 1 are increased or decreased from a terminal 39 as shown in FIG. 9.

In the invention, although these adjustments can be also performed by the conventional means, it is recommended to use the following means, which will be explained later, because those means can solve the drawbacks of the conventional techniques, which will be explained hereinafter.

In the conventional image adjusting means, the gains of the gain controllers 5, 6, and 7 in FIG. 2 are increased or decreased in parallel. In such a case, there is a problem in that a variation occurs in the gain control amounts of the gain controllers 5, 6, and 7 due to a variation in devices such as transistors and the like, so that the color becomes too redish or greenish.

In the conventional black level adjusting means, since there is an operation to shift in parallel the bias of the whole video signal which is transmitted, there is a problem that the finite video output dynamic range is damaged.

Figure 10:
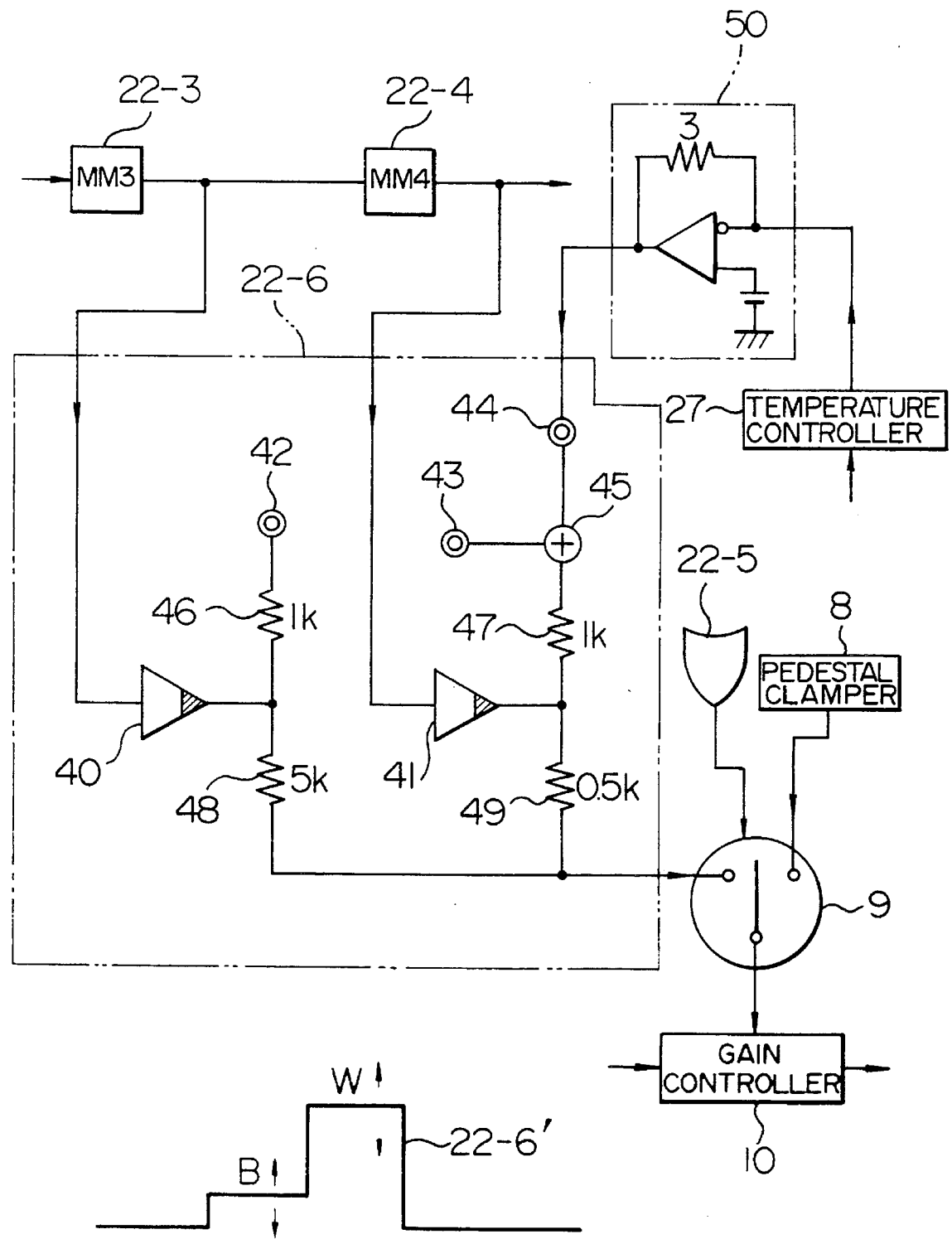
FIG. 10 is a circuit diagram showing a main section in the second embodiment of the invention.

FIG. 10 shows a main section of novel adjusting means which can be applied only when the system construction of the invention is used.

The above novel adjusting means forms the second embodiment of the invention in combination with FIG. 2.

In FIG. 10, a block surrounded by a broken line 22-6 relates to a modification in which the mixing circuit or detecting insertion signal synthesizer 22-6 in FIG. 3A is developed. The above block constructs a part of the signal generator 22 in FIGS. 2 and 3A.

The block 22-6 in FIG. 10 will now be described hereinbelow.

Reference numerals 40 and 41 denote open collector gates; 46 and 47 load resistors thereof; 48 and 49 waveform synthesizing resistors; and 42 a black level adjusting terminal. By increasing or decreasing the voltage at the terminal 42, the portion of B (insertion black signal for detection) in the output waveform in FIG. 3B can be increased or decreased. Reference numeral 43 denotes a terminal for image adjustment. The portion of W (insertion white signal for detection) in the waveform 22-6' can be increased or decreased by increasing or decreasing the voltage at the terminal 43 from the outside. An output of the temperature controller 27 in FIG. 2 is applied to a terminal 44 through an operational amplifier 50 in FIG. 10. Reference numeral 45 denotes an adder.

In operation, when the voltage of the insertion black signal for detection is increased by only ΔB by increasing the voltage at the black level adjusting terminal 42, the voltage corresponding to the black current which is generated from the S/H circuit 14 becomes too high, as will be understood by referring to FIGS. 10 and 2. The second loop consequently operates so as to drop the voltage of the second grid of the CRT.

Figure 11:
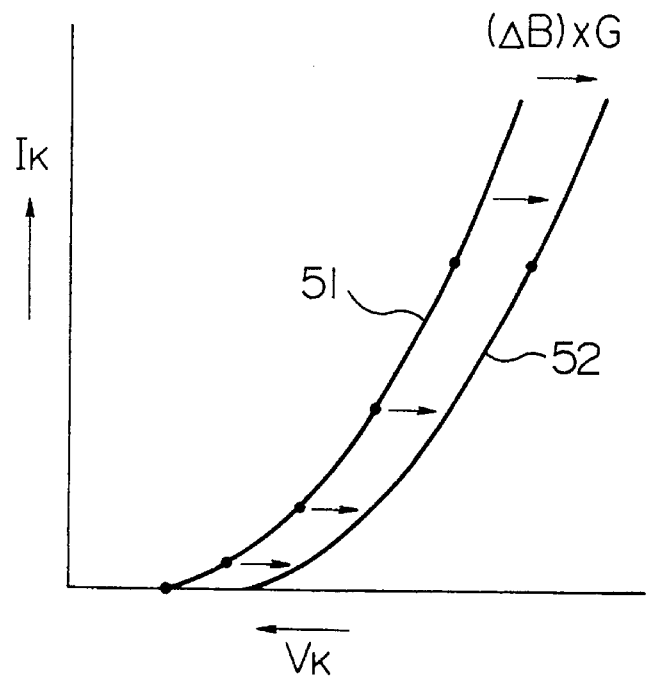
FIG. 11 is a characteristic curve diagram for explaining an effect of the second embodiment of the invention.

Thus, the converting characteristics of the cathode current $I_K$ to cathode voltage $V_K$ of the CRT are shifted from a curve 51 of the characteristics in the original state before the voltage is changed by ΔB to a curve 52 after the voltage was changed by ΔB, as shown in FIG. 11. The black level of the reproduced image, accordingly, can be shifted. A shifted amount converted in equivalent cathode voltage is expressed by (ΔB)×G. G denotes a voltage gain from the analog switch 9 in FIG. 2 to the cathode of the CRT 1 and is set to about 50.

An advantage which should be noted here is that the operating point of the detecting insertion black signal has merely been shifted, and the operating point of the input video signal never changes in the range from the initial stage to the final stage. Therefore, the ideal black level can be adjusted while always optimally keeping the dynamic range of the video output amplifier.

In FIG. 10, when the voltage of the detecting insertion white signal is increased by raising the voltage at the image adjusting terminal 43, the voltage corresponding to the white current which is generated from the S/H circuit 13 becomes too big, as will be understood with reference to FIGS. 10 and 2. Therefore, the first loop operates so as to reduce the gain of the gain controller 10, so that the image adjusting function is accomplished.

An advantage which should be noted here is that in the gain controller 10, the white current is stabilized by the negative feedback operation of the foregoing first loop for each of the gain controllers including the gain controller group for the other two colors omitted in FIG. 2. It is, therefore, possible to solve the problem of white chromaticity change which is a drawback of the conventional technique. Further, there is an advantage in that the gain controllers 5, 6, and 7 in FIG. 2 can be dispensed with.

As a modification of the second embodiment, the voltage at the terminal 17 in FIG. 2 can be also adjusted in place of adjusting the voltage at the terminal 43.

Figure 12:
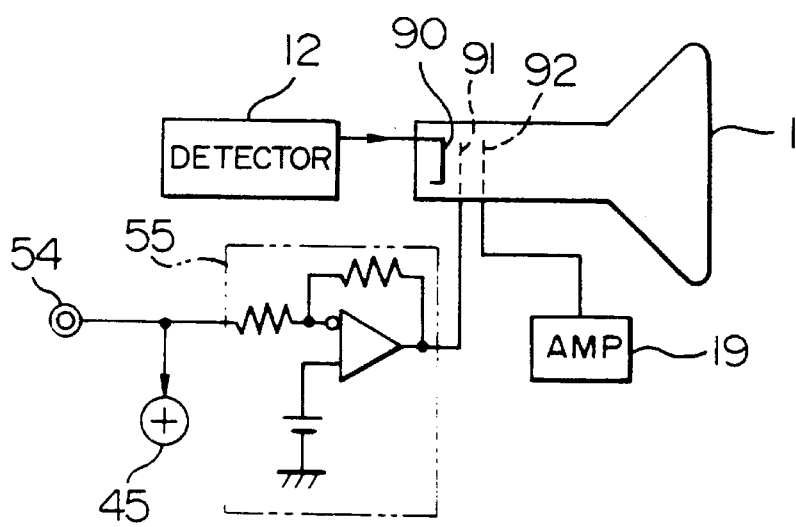
FIG. 12 is a circuit diagram showing a main section of the third embodiment of the invention.

FIG. 12 shows a main section of the third embodiment. In the diagram, reference numeral 54 denotes a terminal to control the bias voltage of the first grid of the CRT 1. When the voltage at the terminal 54 drops, the first grid bias voltage increases through an inverter amplifier 55. Thus, the cathode current increases. On the other hand, since the voltage at the terminal 54 is added to the adder 45 in FIG. 10, the voltage of the inserted white signal for detection drops in association with an increase in first grid voltage.

As a whole effect, therefore, although the inserted white signal voltage drops, the cathode current corresponding to the inserted white signal voltage hardly changes. Thus, the cathode current corresponding to the actual video input signal increases due to an increase in first grid voltage. There is, accordingly, an advantage in that only the converting efficiency of the CRT can be raised, without changing the dynamic range of the video output and the bias point.

Generally, the CRT has physical characteristics such that when it is used in an increased state of the first grid bias voltage, the focusing performance deteriorates but a perveance increases. There are also characteristics such that when the CRT is used in a state in which the first grid bias voltage has been dropped, the focusing performance is improved but a perveance deteriorates.

It is generally desirable that the display use either proper one of the two characteristics in dependence on the content of the input video signal. The third embodiment is suitable to such a field.

For convenience of the utilization of the third embodiment, an experimental equation of the perveance which can be applied to the CRT over a wide range and which has been found by the inventors is shown below.

$$I_K \approx 4 \text{ mA} \cdot \frac{E_{KC}^{2.9}}{100 \text{ V}^{1.5} \cdot E_{co}^{1.4}} \quad (11)$$

where, $I_K$: Cathode current $E_{KC}$: Cathode drive voltage relative to the cut-off voltage $E_{co}$: Cathode cut-off voltage relative to the first grid voltage As a fourth embodiment, FIG. 13 shows a main section of an effective embodiment when the invention is applied to what is called a multiscan type display.

In the diagram, reference numerals 21, 20, and 20' denote the supplemental deflector, vertical deflecting coil, and supplemental vertical deflecting coil in FIG. 2, respectively. Reference numeral 23-4 denotes a vertical deflection current detecting resistor. Reference numeral 22-5' denotes the pulse for the local overscan similar to 22-5' in FIG. 5.

Figure 13:
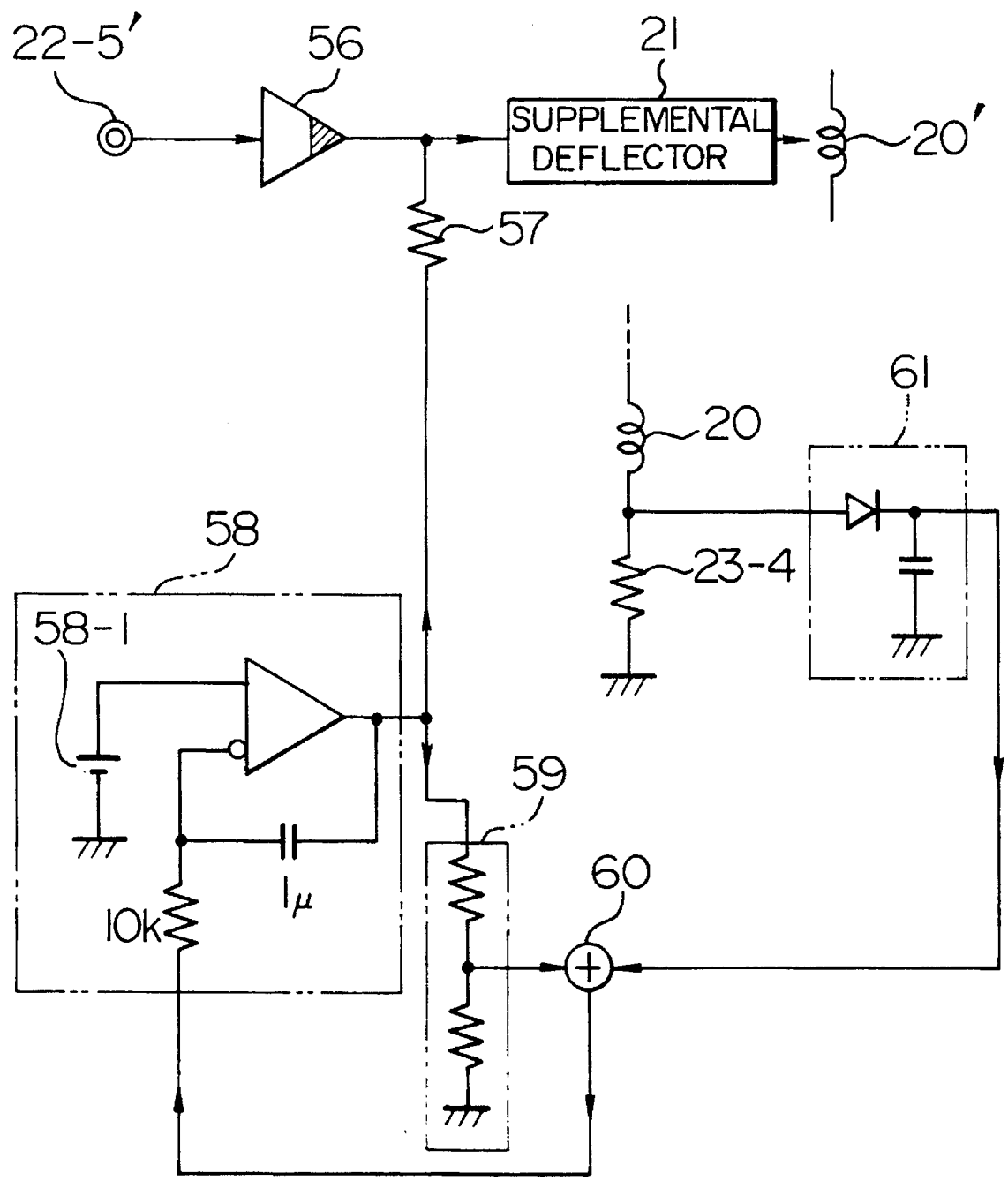
FIG. 13 is a circuit diagram showing a main section of the fourth embodiment of the invention.

The main section in FIG. 13 is a portion shown by reference numerals 56, 57, 58, 59, 60, and 61. The multiscan type display is a display which can cope with signal sources of various scanning systems. Therefore, there are both cases where an image is overscanned and cases where an image is underscanned in dependence on the signal source.

In the construction of FIG. 4 mentioned above, since an amplitude of the local overscan pulse 22-5' is constant, when the circuit of FIG. 4 is made operative in the case where an image itself has already been overscanned, the total local overscan amount becomes too big. As a side effect, therefore, there is a case where the electron beam of the CRT collides with the neck portion and the scattered reflected electrons generate a flare interference on the image. Such a phenomenon is called a neck shadow.

It is a purpose of the fourth embodiment to avoid such a neck shadow. Explanation will now be made hereinbelow with respect to components 56 to 61 in FIG. 13. Reference numeral 56 denotes an open collector type gate; 57 a load resistor thereof; and 58 an operational amplifier for integration whose output also commonly serves as a power source for the resistor 57. Therefore, when the output of the operational amplifier 58 is equal to 0, the output pulse of the gate 56 is also equal to 0. The output of the operational amplifier 58 is attenuated by an attenuating circuit 59 and supplied to an adder 60.

Reference numeral 61 denotes a detector to detect a vertical deflecting current amplitude. An output of the detector 61 is supplied to the adder 60. The components 58, 59, and 60 constitute a negative feedback loop and operate so that the output of the adder 60 coincides with a reference voltage 58-1. Therefore, the value of the reference voltage 58-1 is selected so as to be equal to the output voltage of the adder 60 when the output of the operational amplifier 58 is equal to 0 (local overscan is set to zero) and the case where the vertical deflecting current is in an overscan state. In the above construction, in place of the open collector gate 56, it is also possible to use an arbitrary member having a function such that the output is released when the input pulse 22-5' is at the "H" level and the output is short-circuited to the GND when the input pulse is at the "L" level.

Further, the attenuation ratio of the attenuator 59 is selected such in a manner that deflection amounts per unit voltage, when they are converted into equivalent input voltages referred to the two inputs of the adder 60, are equal to each other. That is, the deflection amount through the supplemental deflecting coil 20' and the deflection amount through the deflecting coil 20 are equalized when they are converted into the equivalent input voltages of the adder 60.

The circuit operation will now be described. First, in the case where the deflection amount through the vertical deflecting coil 20 is already large to a certain degree and no luminescent-line interference appears in the upper portion of the display area of the screen, the output voltage of the operational amplifier 58 is set to 0 because of the foregoing construction, so that the output pulse amplitude of the gate 56 is set to 0 and the supplemental deflecting current is also consequently set to 0.

In the case where the deflecting current of the vertical deflecting coil 20 is in the underscan state, the output of the adder 60 decreases, so that the output of the operational amplifier 58 increases. Thus, the input to the adder 60 increases and the output of the adder 60 finally settles at a point where it coincides with the reference voltage 58-1.

At this time, a positive voltage is generated at the output of the operational amplifier 58, and a pulse amplitude which coincides with the positive voltage is derived in the output of the gate 56. The supplemental deflector 21 allows a local overscan current to flow in the supplemental deflecting coil 20' by the pulse amplitude on the basis of the principle which has already been described in FIG. 4. Therefore, target overscan of a predetermined amount is assured, so that neck shadow interference is eliminated.

Figure 14:
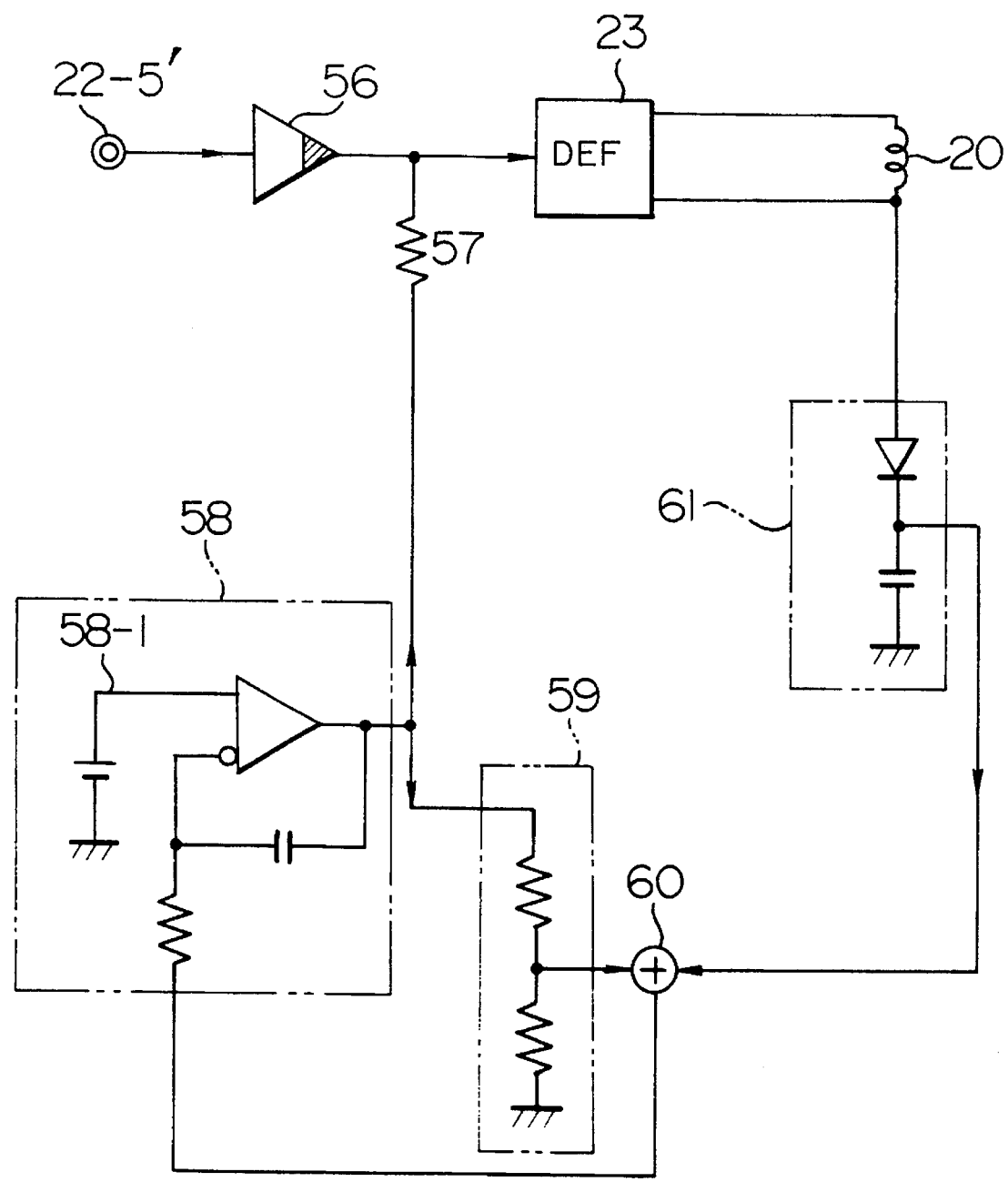
FIG. 14 is a circuit diagram showing a main section of the fifth embodiment of the invention.

FIG. 13 relates to the improved embodiment of FIG. 4. FIG. 14, showing the fifth embodiment, relates to the improved embodiment of FIG. 5. The fifth embodiment shows the construction in the case where a CRT having no supplemental deflector is allowed to execute the overscan by using the deflector 23. Since the circuit construction and operation of FIG. 14 are similar to those in FIG. 13, their descriptions are omitted here.

Figure 15:
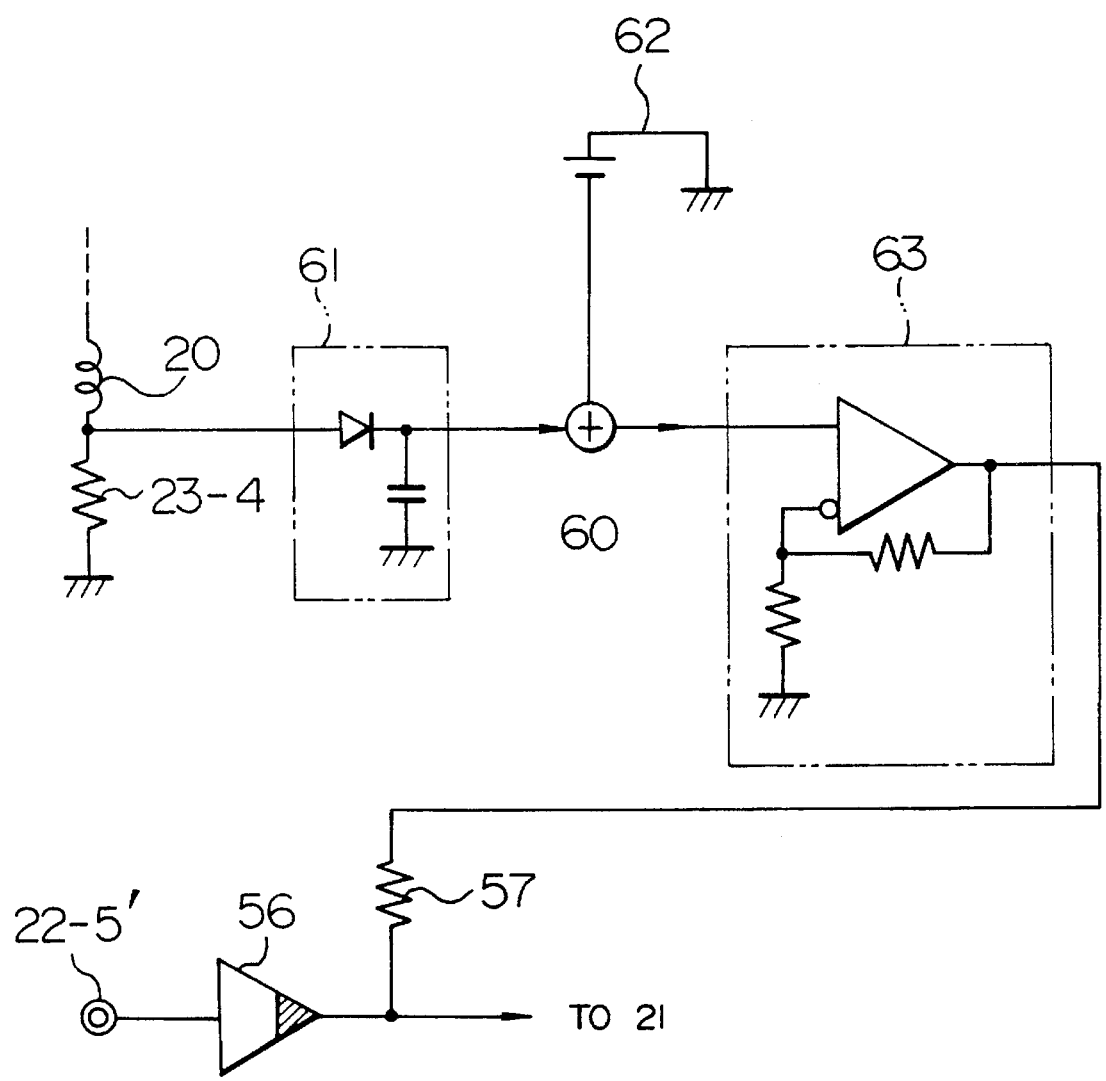
FIG. 15 is a circuit diagram showing a main section of the sixth embodiment of the invention.

FIG. 15 shows the sixth embodiment of the invention. The object to be accomplished by the sixth embodiment shown in FIG. 15 is the same as that of the embodiment shown in FIG. 13. The embodiment shown in FIG. 13 uses the negative feedback system. The embodiment shown in FIG. 15 uses a feed forward system.

In FIG. 15, reference numeral 62 denotes a negative reference voltage source, and 63 indicates an inverter amplifier. The voltage of the reference voltage source 62 is set to a value corresponding to a predetermined overscan amplitude. The gain of the amplifier 63 corresponds to the attenuation ratio of the attenuator 59 in FIGS. 13 and 14.

By adopting the fourth to sixth embodiments described above, the problems of luminescent-line interference and neck shadow in the upper portion of the screen due to the detecting insertion white signal can be solved.

Figure 16:
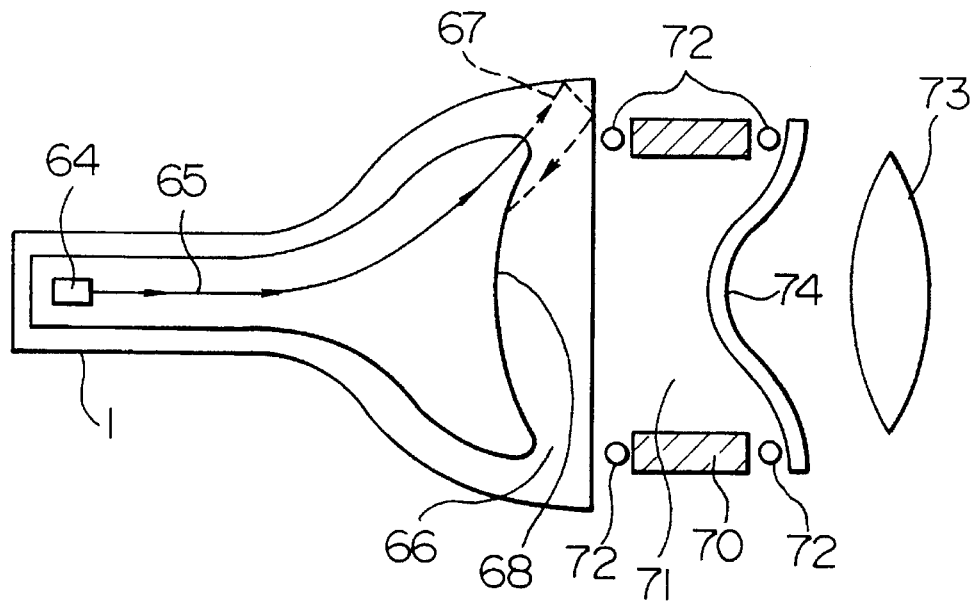
FIG. 16 is a vertical sectional view of a cathode ray tube for explaining a problem of the conventional technique.

However, when the screen is observed in detail, it has been found out that the problem of an optical flare still remains. FIG. 16 shows a diagram for explaining the problem of such an optical flare. FIG. 16 is a vertical sectional diagram of the CRT 1.

In FIG. 16, reference numeral 64 denotes an electron gun; 65 an electron beam in an overscan state; 66 a face glass in which a fluorescent material is coated onto the inner surface; and 67 a path of light generated from the fluorescent material due to the overscanned electron beam.

Generally, when the light is emitted from the inside of a medium having a refractive index of n into the air whose refractive index is close to 1, according to Snell's law, a total reflection phenomenon occurs in the region where the incident angle is equal to or larger than $\sin^{-1}(1/n)$. In the case of the CRT glass, the value of n is about 1.6, so that the total reflection angle is set to about 39°.

Therefore, the light 67 is totally reflected by the face side wall and the face front surface and enters a region 68 on the screen and harms the fluorescent material, which reflect the light, so that a harmful optical flare interference is caused.

In FIG. 16, component elements 70 to 74 in the case where the invention is applied to the projection type display are shown as a reference. Reference numeral 73 denotes a main lens element; 74 a sub-lens element; 71 the liquid filling between the sub-lens element 74 and the face glass 66; 70 a container which functions as side walls for the liquid 71; and 72 sealings to seal the liquid 71.

Figure 17:
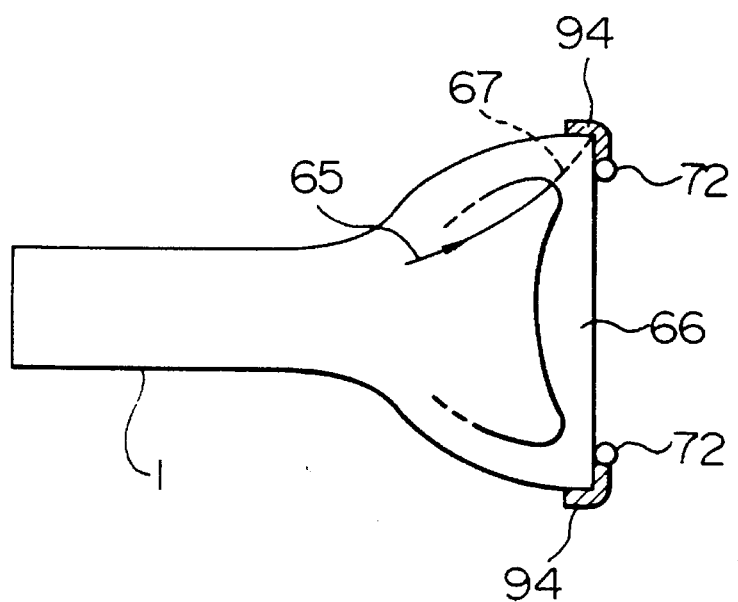
FIG. 17 is a vertical sectional view of a cathode ray tube showing a main section of the seventh embodiment of the invention.

A countermeasure to solve the optical flare interference which occurs due to the overscan beam is shown in FIG. 17 as a seventh embodiment. A main section of the seventh embodiment relates to a black tape 94. An adhesive agent is disposed onto the inner surface of the black tape 94, so that the black tape 94 optically comes into contact with the corner portion of the face glass 66. The black tape, consequently, absorbs the corner light 67 occurring due to the overscan beam 65, and flare interference can be eliminated.

A necessary region of the black tape 94 is set to a range which covers at least the edge portion of the face glass from the portion near the sealing. It is effective to adhere the black tape to the whole periphery of the edge portions of the CRT face glass as well as only the upper edge of the CRT 1. This is because in the multiscan type display, the case of enlargedly displaying the image itself exists as an application.

In place of the black tape, a black ink can be also coated onto the surfaces of the edge portions. That is, it is an essential requirement of the seventh embodiment shown in FIG. 17 that in the display using the CRT, at least the upper edge portion of the face glass optically comes into contact with black medium means. It is also possible to further use a method whereby the fluorescent material portion on the side of the edge portion of the face inner surface is made inoperative.

The eighth embodiment of the invention will now be described. It is an object of the eighth embodiment to prevent deterioration of the black balance which is caused by to an offset leakage current $I_{CBO}$ of the transistor (12-1 in FIG. 7) which is used in the cathode current detector 12 in FIG. 2.

Since the transistor 12-1 in FIG. 7 is arranged around the cathode of the CRT 1, its junction temperature becomes a high temperature of about 100° C. According to the semiconductor physics, there is a case where the leakage current increases by about two times each time the temperature rises by 10° C. and reaches a value of the order of about 10 μA. Since a magnitude of the black detection current is equal to about 50 μA as mentioned above, there is a case where a black balance deviation of about 20% occurs.

Figure 18:
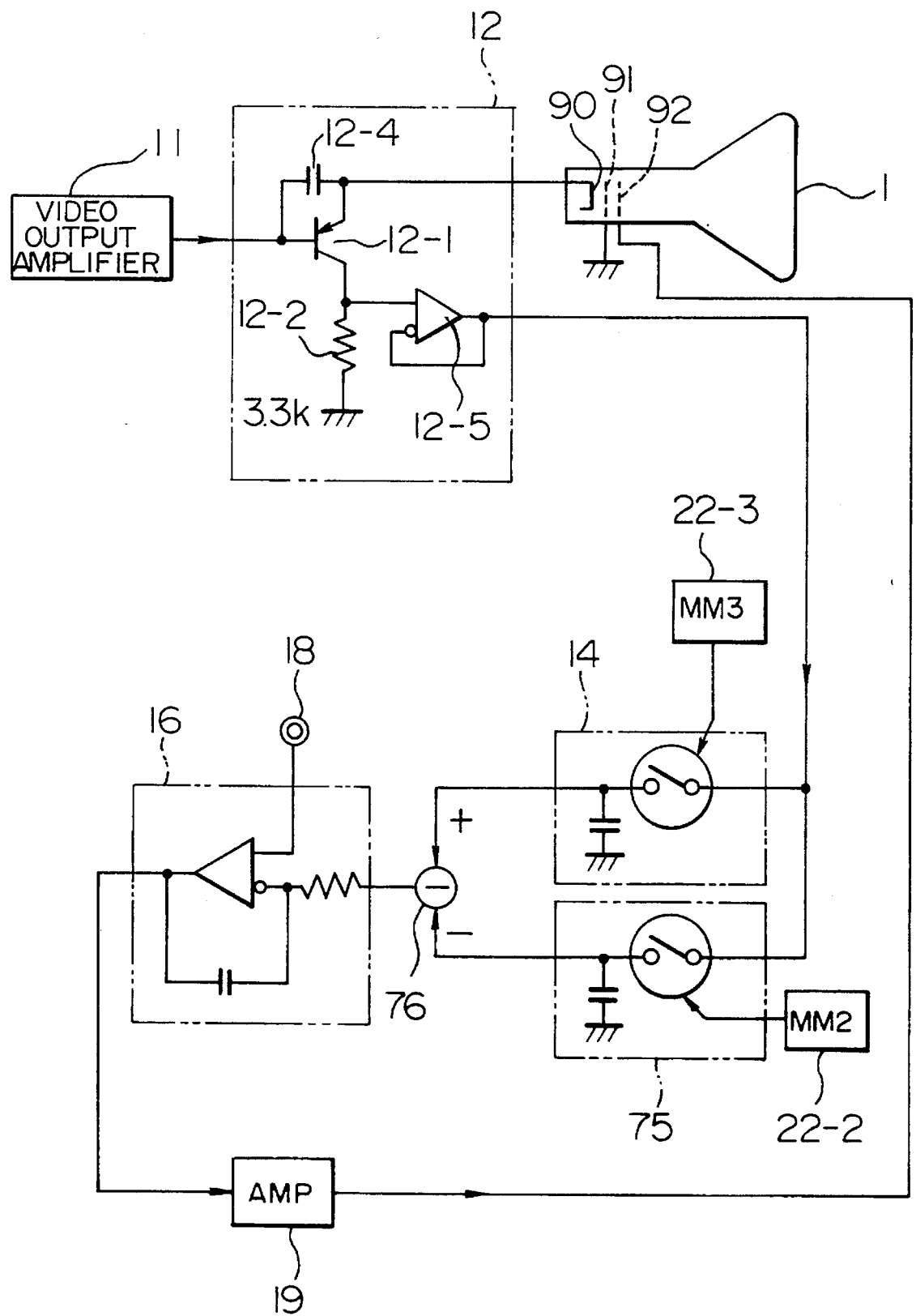
FIG. 18 is a circuit diagram showing a main section of the eighth embodiment of the invention.

FIG. 18 shows a main section of the eighth embodiment as a countermeasure to solve the above problem. The eighth embodiment relates to the improvement of the foregoing second loop (black current stabilization) in FIG. 2.

FIG. 18 differs from FIG. 2 with respect only to component elements 75 and 76. Reference numeral 75 denotes a sample and hold (S/H) circuit to detect the offset of the transistor 12-1. A switch as a sampling section in the S/H circuit 75 is closed only for the period of time during which the output pulse of the monostable multivibrator 22-2 in FIG. 3A is at the "H" level.

As will be understood from the waveform diagram of the detecting insertion signal 22-6' in FIG. 3B, the above period of time corresponds to the blanking level. Therefore, the cathode current flowing in the transistor 12-1 is equal to zero and only the offset current flows. Reference numeral 76 denotes a subtracter to obtain an actual detection black current corresponding output by subtracting the output of the S/H circuit 75 from the output of the S/H circuit 14.

Therefore, the problem of the offset of the transistor 12-1 can be solved, so that an excellent image of a high picture quality in which a black balance state is held can be always reproduced.

Figure 19:
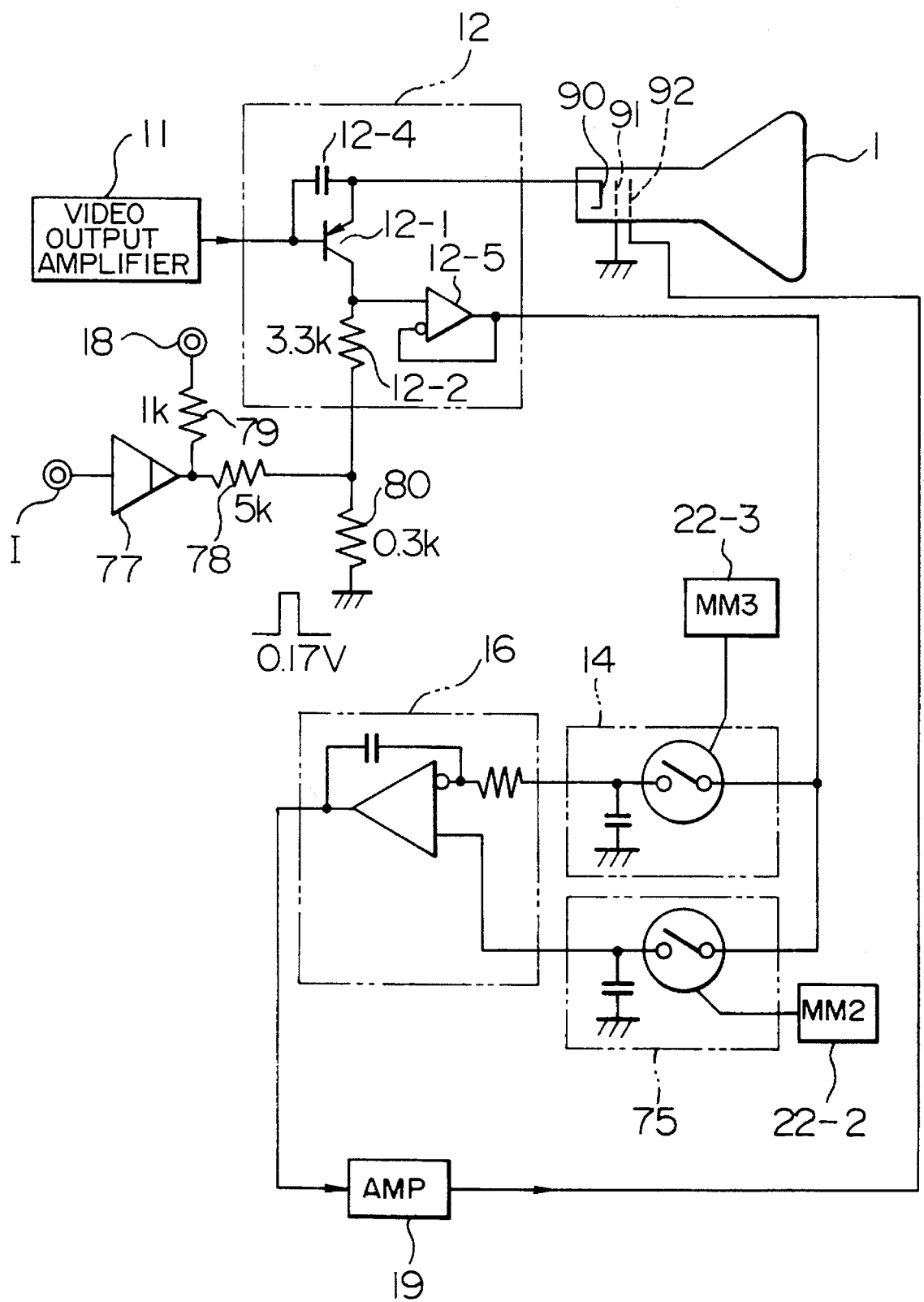
FIG. 19 is a circuit diagram showing a main section of the ninth embodiment of the invention.

An example in which the subtracter 76 in the eighth embodiment shown in FIG. 18 is modified to the pulse correction on the input side is shown in FIG. 19 as a ninth embodiment. In FIG. 19, reference numeral 77 denotes an open collector type gate. An output pulse of the monostable multivibrator 22-2 mentioned above is supplied as an input I to the gate 77. Reference numeral 79 denotes a load resistor; 18 a reference voltage source; and 78 and 80 coupling resistors.

According to the above construction, a pulse can be multiplexed to the output of the cathode current detector 12 for only the period of the output pulse from monostable multivibrator 22-2 to detect the offset. The pulse amplitude is set to the product (about 0.17 V) of a target black current (about 50 μA) and the resistance (3.3 kΩ) of the resistor 12-2. The output of the S/H circuit 14 is supplied to the inverting input of the amplifier 16. The output of the S/H circuit 75 is supplied to the non-inverting input of the amplifier 16. The detected black current is stabilized so as to coincide with the target black current by the operation of the negative feedback loop (12, 14, 75, 16, 19, 1). The description of the ninth embodiment is now completed.

In the fundamental embodiment (FIG. 2) of the invention, a vertical blanking circuit and a horizontal blanking circuit are not shown but can be inserted between the pedestal clamper 8 in FIG. 2 and the analog switch 9. Thus, on the basis of the operation of the analog switch 9, the blanking is made inoperative for the period of time during which the inserted signal for detection exists, and the blanking is normalized for a period of time during which the inserted signal does not exist. In the case of applying the vertical blanking to the portion after the analog switch, another means for eliminating the period of the inserted signal for detection is used.

There can be a case where it is intended to perform the blanking off of the inserted white signal during a horizontal blanking period in dependence on the format of the display. In such a case, it is sufficient to correct the waveforms 22-3', 22-4', and 22-6' in FIG. 3B by another gate means so as to be set to the "L" level only for the horizontal blanking period. It is not always necessary that the pulse signal generator 22 uses the four monostable multi-vibrators shown in FIG. 3A. That is, well-known waveform synthesizing means using a digital counter can also be used.

Although the invention has been described on the assumption of the application mainly to the projection type display, the invention can be also applied to an ordinary direct view type CRT display in which three electron guns are included in one CRT. If the direct view type CRT independently has three second grid electrodes, the invention can be directly applied. In the case of the display of the type in which the CRT has only one second grid electrode and only one first grid electrode, the following tenth embodiment can be used for the black current stabilizing loop.

Figure 20:
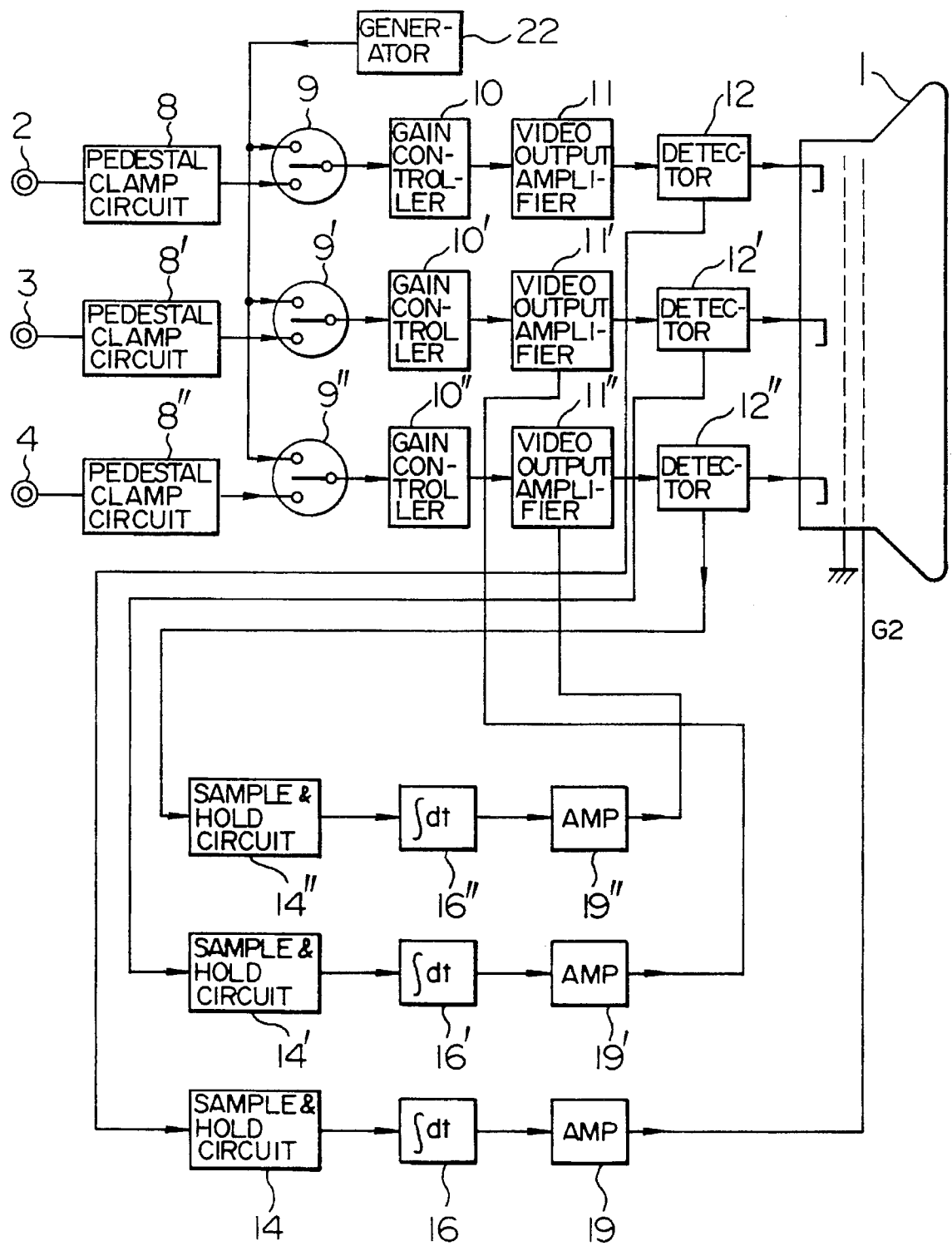
FIG. 20 is a circuit diagram showing the tenth embodiment of the invention.

FIG. 20 shows the tenth embodiment of the present invention. In the diagram, the portions having the same functions as those in FIG. 2 are designated by the same reference numerals. As will be understood from FIG. 20, the black current stabilizing loop is made operative through the second grid of the CRT for only one particular color, and, with respect to the other two colors, the bias point of each cathode is shifted via output amplifiers 11' and 11".

Since the AKB system of the conventional technique is based on the method of controlling the biases of the cathode electrodes for three colors, there is a problem of the deterioration of the dynamic range in association with the black level adjustment as mentioned with reference to the prior art of FIG. 9.

In the construction of FIG. 20 according to the tenth embodiment of the invention, by controlling the voltage at the terminal 42 already mentioned in FIG. 10, the black level adjustment can be accomplished. Therefore, the problem of the deterioration of the dynamic range of the video output amplifier can be solved on the basis of the principle mentioned in FIG. 11.

In the case of applying the invention to the projection type display, it is recommended to add a circuit to correct the non-linearity of the fluorescent material, as will be explained hereinlater.

Generally, for the fluorescent material for the blue CRT for the projection type display, the light output to an input electric power density shows saturation characteristics.

Figure 21:
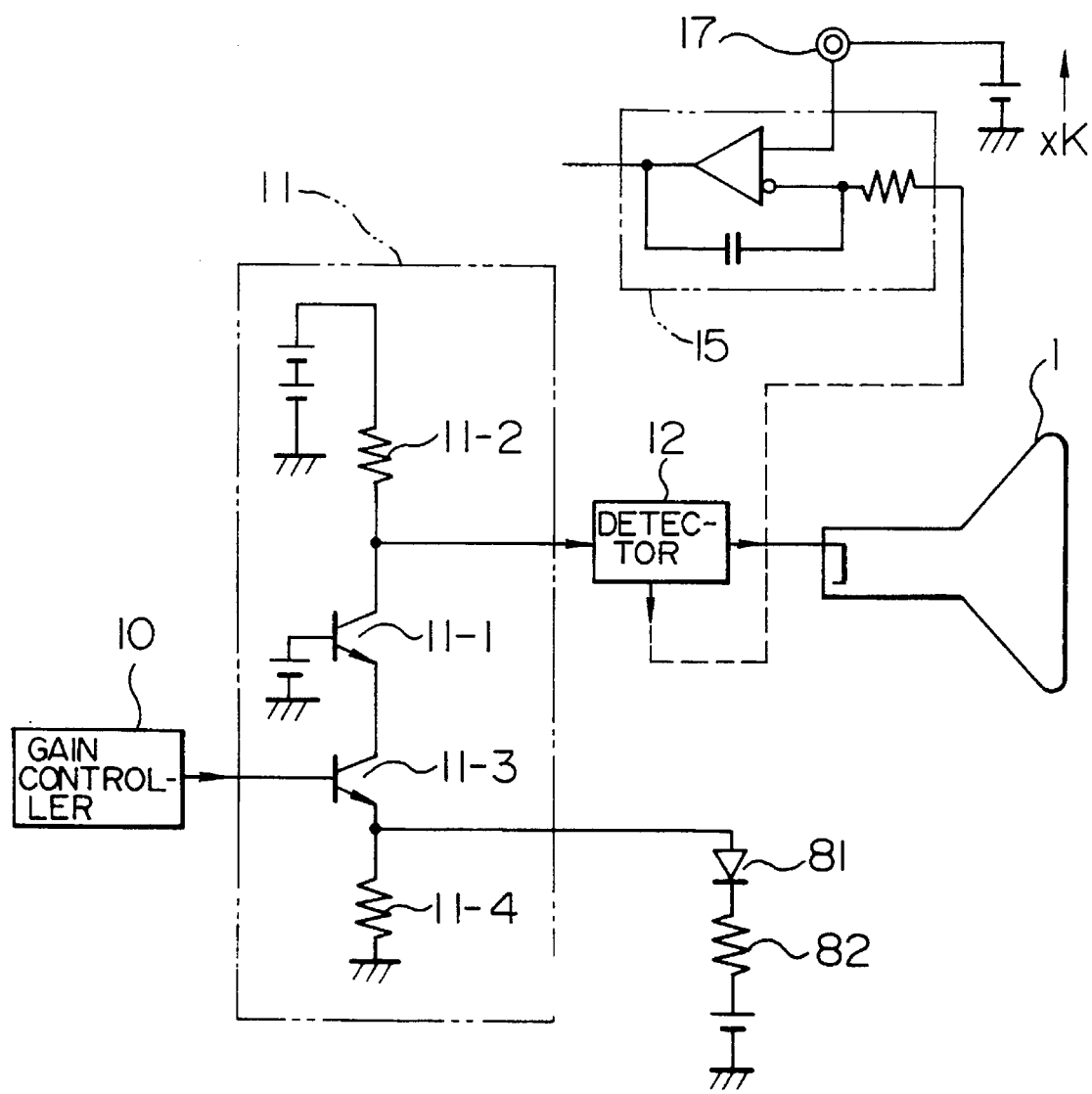
FIG. 21 is a circuit diagram showing a main section of the eleventh embodiment of the invention.

A main section of a circuit to be used to compensate the saturation characteristics in the case where the CRT 1 of FIG. 2 shows the saturation characteristics is shown in FIG. 21 as an eleventh embodiment. In FIG. 21, reference numeral 11 denotes a specific example of the video output amplifier circuit 11 in FIG. 2. Transistors 11-1 and 11-3 form a cascade amplifier. Reference numeral 11-4 denotes an emitter resistor to set a gain; 81 a silicon diode; and 82 a gain energizing resistor.

Figure 22:
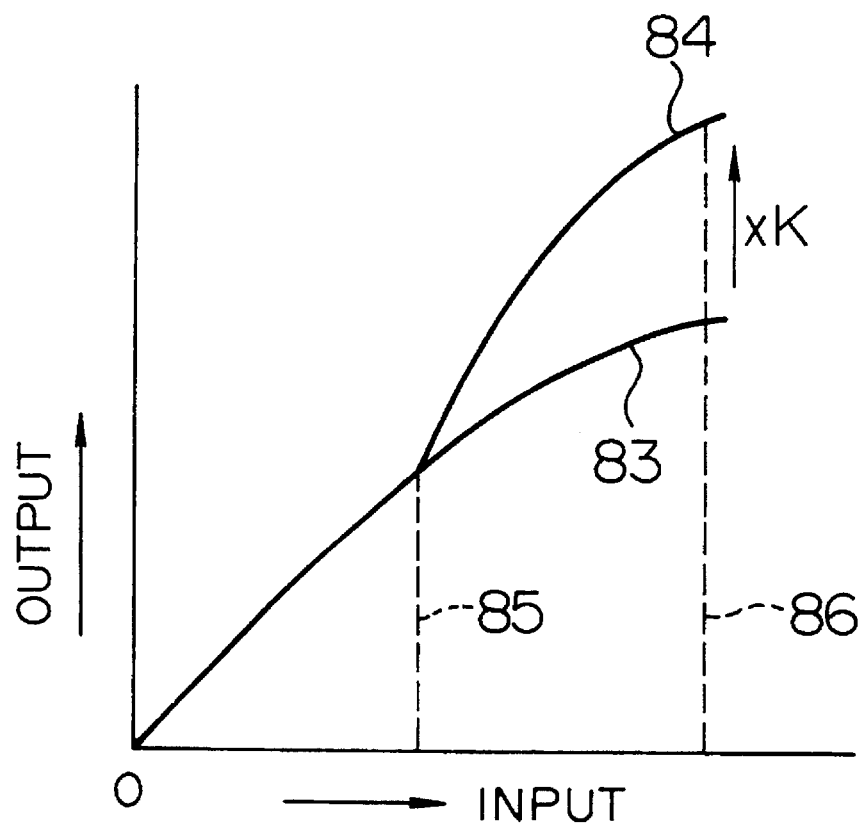
FIG. 22 is a characteristic diagram showing the operation of the circuit of FIG. 21.

FIG. 22 shows operating characteristics of the circuit in FIG. 21. In the graph of FIG. 22, the abscissa denotes the input signal level, and the ordinate indicates the light output level. The graph 83 relates to the case where no diode 81 is used in FIG. 21. The saturation characteristics of the fluorescent material appear on the graph 83. The graph 84 relates to the case where the diode 81 is used. It will be understood that the linearity is improved by the gain energizing operation of the resistor 82.

In FIG. 22, broken line 85 corresponds to a threshold value at which the diode 81 starts conduction in FIG. 21. Broken line 86 shows the level of the inserted white signal for detection. As will be understood from FIG. 22, a light output corresponding to the inserted white signal for detection of the cathode current must be increased by about K (constant indicative of the non-linearity of the fluorescent material) times the level of the white signal. For this purpose, in FIG. 21, the voltage at the terminal 17 to set a reference voltage which in turn sets the value of the cathode current corresponding to the inserted white signal for detection, is set to a value which is about K times the level of the white signal.

That is, it is an essential requirement of the eleventh embodiment that the apparatus has the nonlinear processing circuit means 81 and 82 for correcting the non-linearity of the fluorescent material and the cathode white current stabilizing negative feedback loop means, and that the control target value setting reference voltage 17 of the negative feedback loop is set in accordance with the non-linearity.

With the eleventh embodiment, a fluctuation in white chromaticity, which is caused by at least the temperature characteristics of the diode 81 in FIG. 21, can be substantially corrected.

Figure 23:
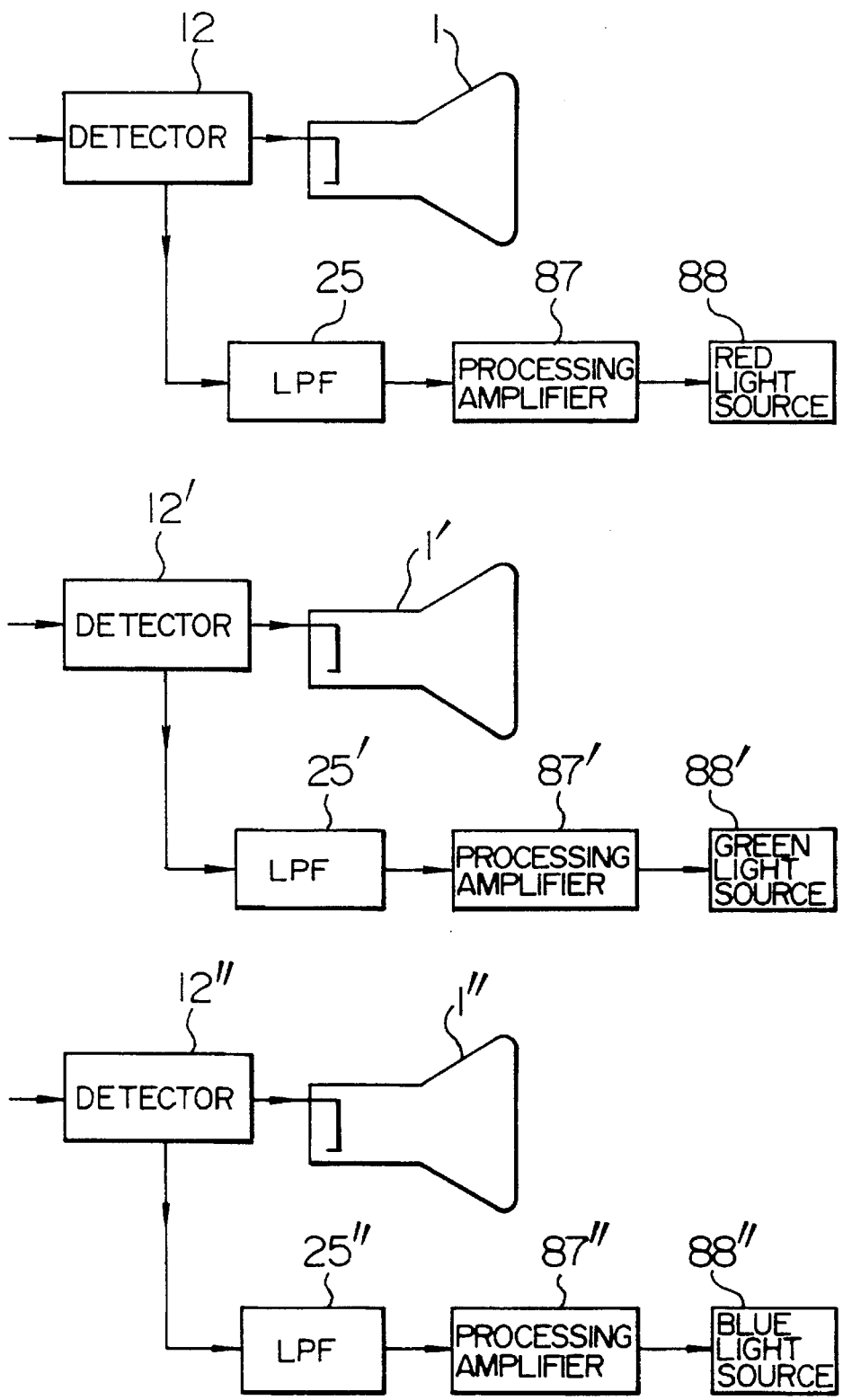
FIG. 23 is a circuit diagram showing the twelfth embodiment of the invention.

A special application example of the cathode current stabilizing system of the invention is shown in FIG. 23 as a twelfth embodiment of the invention. It is an object of the twelfth embodiment to raise the presence by controlling the ambient illumination of a viewer in a projection type display of a large screen in accordance with the mean luminance and the color tone of the screen of the display.

In the diagram, reference numeral 1 denotes the red CRT; 12 the cathode current detector; 25 the same LPF as the LPF shown in FIG. 2; 1' the green CRT; 1" the blue CRT; 12',12", 25',and 25" likewise detectors and LPFs for green and blue; 87, 87', and 87" processing amplifiers; and 88, 88',and 88" ambient illumination light sources of red, green, and blue, respectively, whose light emitting intensities are controlled by the inputs. By the above construction, therefore, the illumination of the ambient environment of the viewer is controlled in accordance with the reproduction image.

According to the various embodiments described above, the following effects may be obtained:

(1) In the case of displaying an image with underscan to scan the image in a range narrower than the frame, since the insertion signal for detection is locally overscanned, the harmful luminescent-line interference which would otherwise occur in the upper portion of the screen can be eliminated.

(2) The neck shadow can be eliminated by controlling the local overscan amount to a proper position out of the display area of the screen.

(3) The optical flare interference which is caused by the overscan portion can be eliminated.

(4) The problem of the deterioration of the dynamic range in association with the black level adjustment can be solved.

(5) The problem of the deterioration of the white balance in association with the image adjustment (gain control of the video signal) can be solved.

(6) Damage of the CRT and projection lens can be prevented.

(7) The harmful generation of the smear waveform associated with beam current detection in the reproduced image can be prevented.

(8) The black balance drift occurring due to the offset drift of the cathode current detector can be eliminated.

(9) The perveance of the CRT can be easily adjusted and, in such a case, the white/black balance is held.

(10) The non-linearity of the light emitting characteristics of the fluorescent material of the CRT can be compensated. In such a case, the light emitting characteristics are stable with a change in ambient temperature.

(11) Since the ambient illumination can be controlled in accordance with the content of the image, the presence is enhanced.

What is claimed is:

1. A display system comprising:

at least one cathode ray tube, said at least one cathode ray tube having three cathode electrodes;

first video amplifiers for amplifying three video signals;

second video amplifiers for outputting three amplified video signals to said three cathode electrodes of said at least one cathode ray tube;

black reference insertion means for inserting a black level reference signal into a part of a vertical blanking period of the three video signals;

cathode current detection means coupling the outputs of said second video amplifiers to said three cathode electrodes, for independently detecting each of three cathode beam currents of said at least one cathode ray tube;

black reference sampling means coupled to said cathode current detection means, for sampling and holding each of three black level cathode beam currents outputted from said cathode current detection means and corresponding to the black level reference signal; and black level control means responsive to said black reference sampling means for automatically and independently controlling each of three optical black levels of said at least one cathode ray tube by adjusting at least one second-grid voltage of said at least one cathode ray tube, thereby correcting a change in a cut-off voltage of said at least one cathode ray tube and at the same time correcting a change in perveance of said at least one cathode ray tube, wherein said cathode current detection means comprises a voltage follower having an output connected to one of said three cathode electrodes of said at least one cathode ray tube and an input connected to receive one of the three amplified video output signals from said second video amplifiers, and a capacitor coupling said output and said input of said voltage follower, so that an output current of said voltage follower is detected through a current return path.

2. A display system according to claim 1, further comprising means for adjusting an optical black level of a reproduced picture by controlling a voltage of the black level reference signal, and at the same time maintaining bias voltages of the video signals substantially constant.

3. A display system according to claim 1, wherein said at least one cathode ray tube has one common first grid electrode, and one common second grid electrode; and wherein said black level control means includes means for adjusting the voltage of said one common second grid electrode and means for adjusting two of three operating bias voltages of said second video amplifiers.

4. A display system according to claim 1, wherein:

said at least one cathode ray tube comprises three cathode ray tubes, each of said three cathode ray tubes having one cathode electrode, one first grid electrode, and one second grid electrode; and said black level control means adjusts respective second grid voltages of each of said three cathode ray tubes.

5. A display system comprising:

at least one cathode ray tube;

first video amplifiers for amplifying three video signals;

second video amplifiers for outputting three amplified video signals to three cathode electrodes of said at least one cathode ray tube;

black reference insertion means for inserting a black level reference signal into a part of a vertical blanking period of the three video signals;

cathode current detection means coupling the outputs of said second video amplifiers to said three cathode electrodes, for independently detecting each of three cathode beam currents of said at least one cathode ray tube;

black reference sampling means for sampling and holding each of three black level cathode beam currents outputted from said cathode current detection means and corresponding to the black level reference signal;

black level control means responsive to said black reference sampling means for automatically and independently controlling each of three black level bias voltages of said at least one cathode ray tube;

means for averaging each of the three cathode beam currents;

means for detecting a maximum value of the three averaged cathode beam currents; and gain control means for controlling in parallel each of three amplification gains of said first video amplifiers;

wherein the cathode current detection means comprises a voltage follower having an output connected to a cathode electrode of said at least one cathode ray tube and an input connected to receive one of the amplified video output signals from said second video amplifiers, and a capacitor coupling said output and said input of said voltage follower, said capacitor having a capacitance of at least 0.5 nF, an output current of said voltage follower being detected through a current return path.

6. A display system according to claim 5, further comprising means for controlling an ambient illumination light in accordance with each of the average cathode beam currents.

7. A display system comprising:

at least one cathode ray tube;

first video amplifiers for amplifying three video signals;

second video amplifiers for outputting three amplified video signals to three cathode electrodes of said at least one cathode ray tube;

black reference insertion means for inserting a black level reference signal into a first part of a vertical blanking period of the three video signals;

cathode current detection means coupling the outputs of said second video amplifiers to said three cathode electrodes, for independently detecting each of three cathode beam currents of said at least one cathode ray tube;

black reference sampling means for sampling and holding each of three black level cathode beam currents outputted from said cathode current detection means and corresponding to the black level reference signal;

black level control means responsive to said black reference sampling means for automatically and independently controlling each of three black level bias voltages of said at least one cathode ray tube;

white reference inserting means coupled to said first video amplifiers for inserting a white level reference signal into a second part of the vertical blanking period of the three video signals;

white reference sampling means for sampling and holding each of three white level cathode beam currents outputted from said cathode current detection means and corresponding to the white level reference signal;

white level control means responsive to said white reference sampling means, for automatically and independently controlling each application gain for the three video signals; and local overscan means incorporated in a vertical deflection circuit for said at least one cathode ray tube, for setting a vertical scan width of said at least one cathode ray tube to be larger than a visible vertical scan width for at least a period of time during which the white level reference signal is inserted.

8. A display system according to claim 7, further comprising a black member disposed at least at an edge portion of a face glass of said at least one cathode ray tube, to thereby prevent occurrence of optical flare interference due to an overscan.

9. A display system according to claim 7, further comprising means for adjusting an optical white level of a reproduced picture displayed on said display system by controlling a voltage of the white level reference signal.

* * * * *